United States Patent [19]
Lax

[11] Patent Number: 5,730,283
[45] Date of Patent: Mar. 24, 1998

[54] PACKAGE AND STORAGE UNIT FOR DIGITAL INFORMATION STORAGE MEDIA

[75] Inventor: Michael Lax, Westbury, N.Y.

[73] Assignee: Autronic Plastics, Inc., Westbury, N.Y.

[21] Appl. No.: 616,924

[22] Filed: Mar. 15, 1996

[51] Int. Cl.⁶ .................................................. B65D 85/57
[52] U.S. Cl. .................... 206/308.1; 206/309; 312/9.41; 312/9.48
[58] Field of Search ............................. 206/303, 307, 206/309, 310, 312, 313, 308.1, 308.2, 308.3, 387.12; 312/9.9, 9.11, 9.29, 9.41, 9.47, 9.48, 9.53, 9.54, 9.56, 9.57

[56] References Cited

U.S. PATENT DOCUMENTS

| Re. 30,184 | 1/1980 | Ackeret | 206/387.12 |
|---|---|---|---|
| 3,232,421 | 2/1966 | Young | 206/52 |
| 3,951,264 | 4/1976 | Heidecker et al. | 206/444 |
| 4,084,694 | 4/1978 | Lainez et al. | 206/444 |
| 4,191,292 | 3/1980 | Schweizer | 206/387.12 |
| 4,239,108 | 12/1980 | Coleman et al. | 206/312 |
| 4,266,784 | 5/1981 | Torrington | 369/77 |
| 4,379,507 | 4/1983 | Llabres | 206/444 |
| 4,387,807 | 6/1983 | de la Rosa | 206/312 |
| 4,463,849 | 8/1984 | Prusak et al. | 206/307 |
| 4,463,850 | 8/1984 | Gorog | 206/309 |
| 4,508,217 | 4/1985 | Long et al. | 206/444 |
| 4,538,730 | 9/1985 | Wu | 206/444 |
| 4,609,105 | 9/1986 | Manes et al. | 206/444 |
| 4,613,044 | 9/1986 | Saito et al. | 206/444 |
| 4,617,655 | 10/1986 | Aldenhoven | 369/291 |
| 4,702,369 | 10/1987 | Philosophe | 206/312 |
| 4,705,166 | 11/1987 | Ackeret | 206/308.1 |
| 4,722,439 | 2/1988 | Grobecker et al. | 206/309 |
| 4,747,484 | 5/1988 | Ackeret | 206/308.1 |
| 4,805,770 | 2/1989 | Groebecker et al. | 206/308.1 |
| 4,807,749 | 2/1989 | Ackeret | 206/309 |
| 4,860,897 | 8/1989 | Fowler et al. | 206/312 |
| 5,011,010 | 4/1991 | Francis et al. | 206/307 |
| 5,191,983 | 3/1993 | Hardy | 206/308.1 |
| 5,205,405 | 4/1993 | O'Brien et al. | 206/308.2 |
| 5,211,283 | 5/1993 | Weisburn et al. | 206/309 |
| 5,213,209 | 5/1993 | Song | 206/309 |
| 5,215,188 | 6/1993 | Wittman | 206/309 |
| 5,219,417 | 6/1993 | O'Brien et al. | 206/312 |
| 5,236,081 | 8/1993 | Fitzsimmons et al. | 206/308.2 |
| 5,249,677 | 10/1993 | Lim | 206/308.1 |
| 5,253,751 | 10/1993 | Wipper | 206/309 |
| 5,259,498 | 11/1993 | Weisburn et al. | 206/309 |
| 5,360,107 | 11/1994 | Chasin et al. | 206/444 |
| 5,366,074 | 11/1994 | O'Brien et al. | 206/308.1 |
| 5,533,619 | 7/1996 | Ziegler | 312/9.57 |

FOREIGN PATENT DOCUMENTS 3923107  1/1991  Germany.

OTHER PUBLICATIONS

International Search Report dated Oct. 16, 1996.

Primary Examiner—Jimmy G. Foster
Attorney, Agent, or Firm—Lowe, Price, LeBlanc & Becker

[57] ABSTRACT

A package and storage unit includes a tray slidable within an endoskeleton/exoskeleton frame. The edge of each surface of the endoskeleton/exoskeleton frame includes a cavity/recess and protrusions to hold a wrapped paperboard with graphics to be wrapped around the frame. Slots on three edges of the rear of the frame receive a folded rear portion of the paperboard. The tray includes a spring with a ledge and two protrusions to securely hold and easily remove the disk from the tray. In an alternative embodiment, the frame includes a pair of parallel pushers, and the tray includes a pair of guides. The arrangement of the pair of pushers and guides is used to securely hold and easily remove the disk from the tray. Both the frame and tray include contour portions to latch the tray in an open or closed position in the frame. A locking mechanism has a housing with parallel flanges to overlie a portion of the faces and a side of the frame and to prevent the tray from being withdrawn from the frame. One end of the locking mechanism is fixed and the other movable between open and closed positions, and a mechanism in the housing retains the movable end of the locking mechanism closed. A decoupler is provided for opening the locking mechanism.

70 Claims, 23 Drawing Sheets

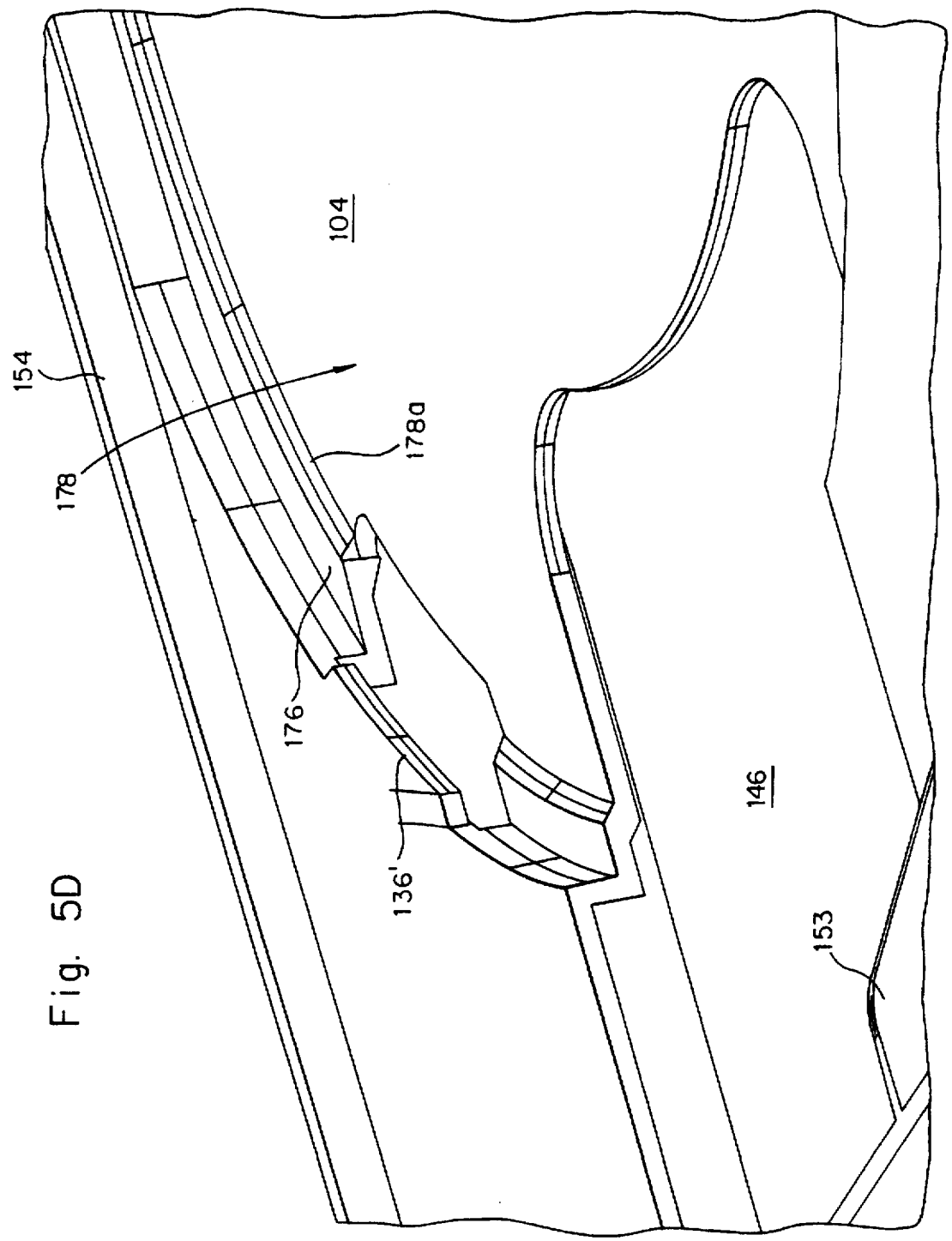

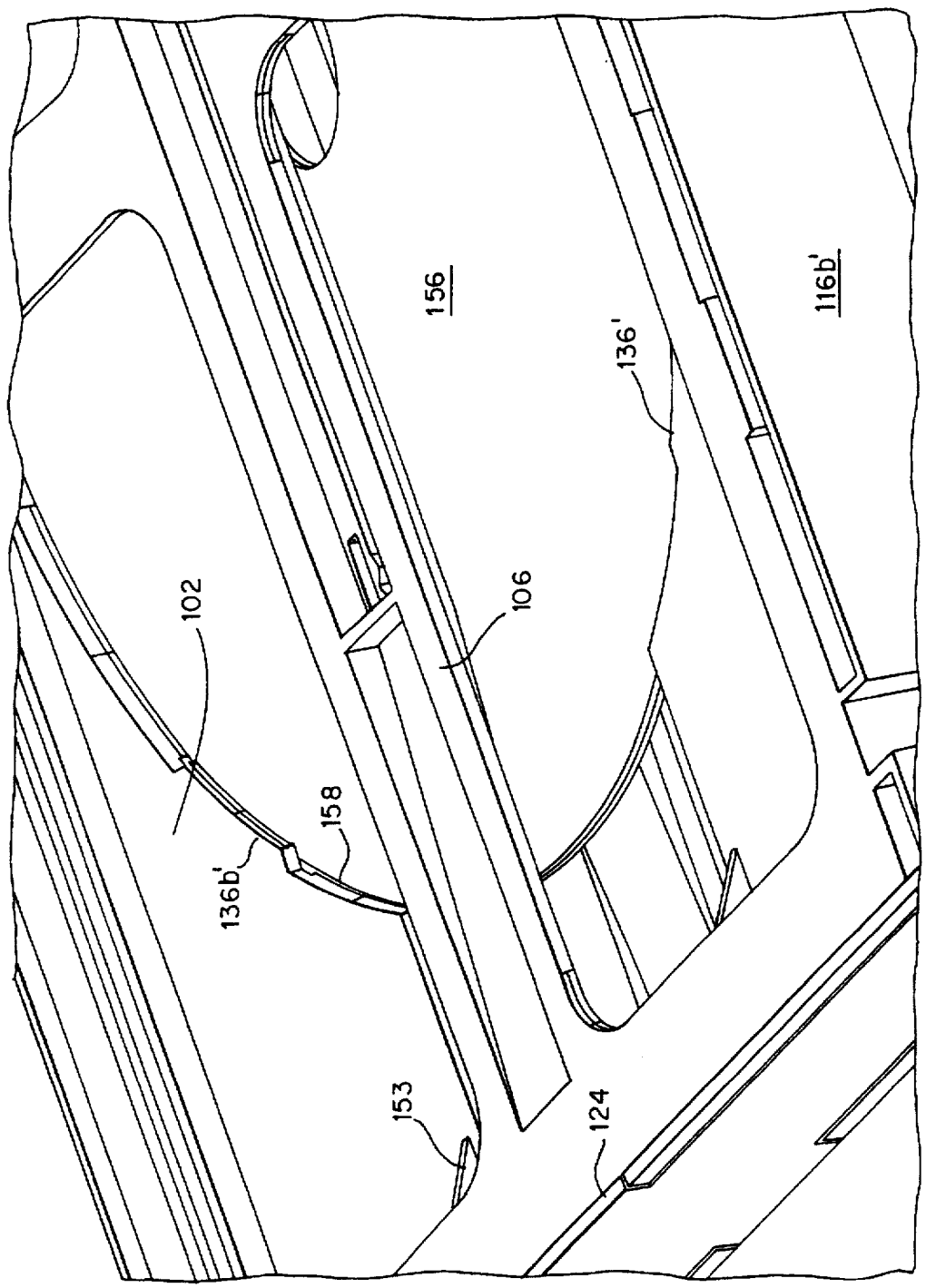

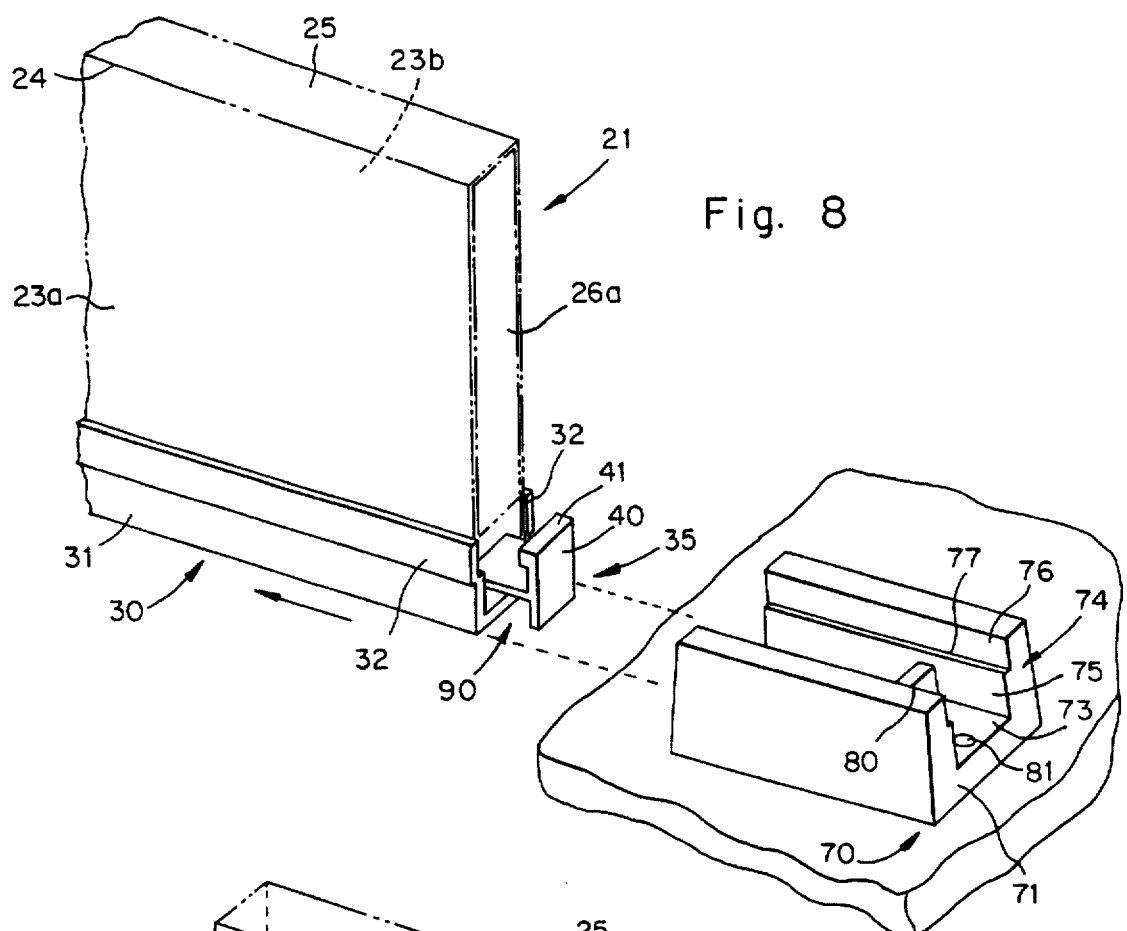
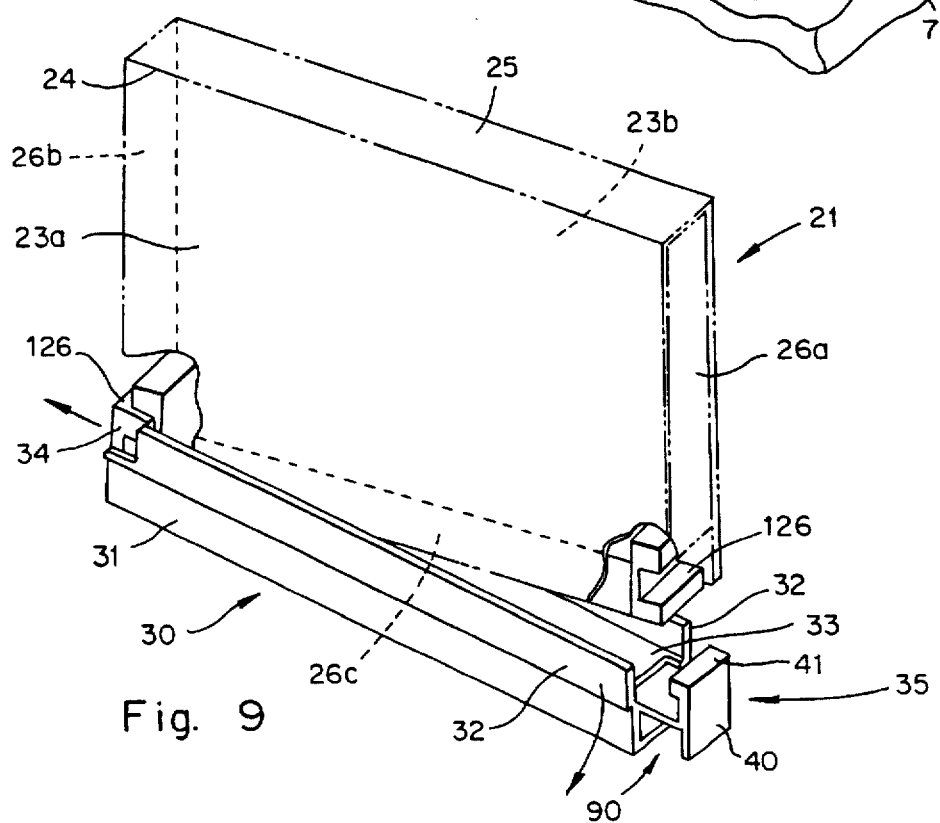

5,730,283

PACKAGE AND STORAGE UNIT FOR DIGITAL INFORMATION STORAGE MEDIA

This application is related to U.S. Provisional application Ser. No. 60/000,835 filed Jul. 3, 1995 and U.S. Provisional application Ser. No. 60/006,582 filed Nov. 13, 1995.

1. Technical Field

The present invention relates to package and storage units for disks, and in particular, to units for packaging and storing digital video disks (DVDs) and to security mechanisms which can be attached to the units to prevent larceny.

2. Background Art

Digital information storage has become very popular. Examples include compact disks (CDs) in the audio industry, CD-ROMs in the computer industry and CDs in the video game industry.

There are various types of prior art containers that are commonly used today for packaging and storing CDs. The most widely used type of CD container, commonly known as a "jewel box," consists of two generally rectangular mating trays joined along a rear edge by a pair of hinges to form a clam shell-like receptacle. Jewel box containers are typically opened by holding the lower tray in one hand and prying the upper tray open with the other. The CD is retained in a molded insert placed in the lower tray. Printed promotion and identifying material are usually fitted inside the container together with the CD.

A CD contained in a jewel box was commonly sold at retail in a package format called a "long box." The long box was approximately twice as long as the width of the jewel box which prevented easy shoplifting. The long box format also provided more area to display information and/or advertising material about the recordings on the CD to attract and inform the customer, and permitted utilization of existing merchandising racks, allowing the consumer to browse rows of the long boxes. Thus, the long box encouraged impulse buying.

However, the consumer discarded the long box after purchase, thereby generating millions of pounds of waste paper annually. This resulted in the long box format being criticized by environmentalists as an example of wasteful packaging. As a result, CDs are today primarily packaged in the traditional jewel box minus the long box, or a similar box such as a "Digipac" or an "Ivy Hill F.L.P."

While jewel box containers are widely used, they suffer from several shortcomings. They are relatively expensive to manufacture since they are constructed from three separate pieces (i.e., an upper and lower tray and a molded insert) using conventional injection-molding technology. As a result of the hinged construction, the jewel box containers are prone to bending or fracturing over time since they are frequently opened and closed. The jewel box containers have a small display area which limits the amount of exposed graphic design and the plastic layer of the cover is not completely transparent, preventing a clear display of the underlying graphics. This discourages impulse buying. The jewel box containers are easy to steal because of their small size. Thus, oversized locks are necessary to deter theft. The "Digipac" and "Ivy Hill F.L.P." suffer many of the same problems as the jewel box. They also include awkward locking mechanisms preventing them from being user friendly, i.e., they are hard to open and close and it is difficult to insert and remove the CD.

CD ROMs also do not utilize a current standard for packaging and storage. However, they are usually packaged and stored in an oversized box containing a jewel box. Since the oversized box is usually discarded, environmental objections could be made concerning wasteful packaging similar to the objections made against the long box.

In the video game industry, each manufacturer, e.g., Sega for its Play Station and 3DO, uses a specific package design. These packages, however, are expensive and larger than necessary to create impulse sales.

Presently, digital video disks (DVDs) are an emerging technology for digital information storage in the video industry. Unlike CDs, however, there is no standard for packaging and storing the DVDs.

The prior art CD containers are considered unsuitable for packaging and storing DVDs because of the problems associated therewith. Thus, there is a need for proper packaging and storage of storage media, e.g., CDs and DVDs, which avoids the problems of the prior art CD containers.

SUMMARY OF THE INVENTION

A feature and advantage of the present invention is to provide a package and storage unit that is easy to open and close, and that is easy to access and store disks.

Another feature and advantage of the present invention is to provide a package and storage unit that allows disks to be removed easily.

Still another feature and advantage of the present invention is to provide sufficient graphic areas to generate impulse sales of disks and to reinforce advertising and theater promotions.

A further feature and advantage of the present invention is to provide an added value to the end user, such as enhancing a home audio and/or video library collection.

A further feature and advantage of the present invention is to prevent theft of the disks.

Another feature and advantage of the present invention is to provide both a user friendly and an environmental friendly package and storage unit for both existing disks and disks embracing emerging technologies.

Another feature and advantage of the present invention is to provide a package and storage unit that is made of cost effective materials and is cost effective to manufacture.

A further feature and advantage of the present invention is to provide a package and storage unit that uses a simple and unobtrusive locking system to prevent theft of the disks.

Still another feature and advantage of the present invention is to provide a package and storage unit having a molded endoskeleton/exoskeleton frame which can be reused for resale when returned by a user.

According to the present invention, the foregoing and other advantages are achieved in part by a package and storage unit with a tray which slides within an endoskeleton/exoskeleton frame. The endoskeleton/exoskeleton frame includes recesses, slots and protrusions to hold a wrapped paperboard on the outside of the frame. Each interior side of the endoskeleton/exoskeleton frame includes parallel rails to guide the tray. Additionally, a strip or a portion of plastic on each face of the frame forming the endoskeleton/exoskeleton frame includes a slot with springs at each end of the slot. The slot guides a raised contour of the tray, and each spring has an inverse contour of the raised contour to latch the tray in an open or a closed position.

The tray includes a spring and protrusions to hold the disk in a recess of the tray, facilitating the removal of the disk by a user. The spring is integral with the tray, and a latch (or lip) of the spring has a step contour. The protrusions have a beveled angled surface to allow quick and easy removal of the disk by the user. The disk is retained in the recess by the bias force of the spring and held beneath the protrusions.

In a second embodiment, the frame further includes a pair of parallel pusher members, and the tray includes a pair of guides which replaces the spring of the above embodiment. The tray also includes a recess with a lower leveled surface surrounded by an angled or bevelled wall with a shelf formed between an edge of the recess and the angled wall. After a user has withdrawn the tray from the frame to an open position, the disk is dropped in the recess. As the user pushes the tray to a closed position within the frame, the pair of pusher members slides within the pair of guides, and eventually, the pair of pusher members contact the edge of the disk. The pair of pusher members push the disk toward the front of the tray by the movement of the tray into the closed position. At the closed position, the edge of the disk is trapped underneath the protrusions near the front of the tray while the pair of pusher members engage the edge of the disk at the rear of the tray.

The locking mechanism includes a housing with a fixed member for engaging one of the recesses or notches on a side of the paperboard wrapped frame, two parallel flanges extending from the housing to overlie the faced of the frame, preventing the tray from being withdrawn from the frame, and a movable member for engaging a recess or notch on the side of the frame. The movable member extends beyond an end of the housing and flanges when the locking mechanism is open and aligns with the end of the housing and flanges when the locking mechanism is closed. An upper surface of the base housing has a recess for receiving a security strip. Each of the two steel pins are retained in a sleeve attached to an inner surface of the base housing, and each steel pin is biased against a surface of the movable member.

A decoupler is provided for opening the locking mechanism. The decoupler is a U-shaped housing having a flat upper surface, two inner surfaces extending from the flat upper surface, an outer surface corresponding to each inner surface, a vertical cross rib attached to the flat upper surface, and a magnet positioned in the housing between each inner surface and the corresponding outer surface. The magnets attract the steel pins when the closed locking mechanism is positioned in the decoupler with the movable member engaging the vertical cross rib.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5D is a detailed illustration of a recess and a protrusion on the tray illustrated in FIG. 5C;

FIG. 5G illustrates the disk firmly secured beneath the pair of protrusions illustrated in FIG. 5D;

FIG. 8 is a perspective view of the security case after the locking mechanism has been unlocked by a decoupler;

FIG. 9 is a view of the locking mechanism being removed from the case;

DETAILED DESCRIPTION OF THE PREFERRED EMBODIMENTS

Figure 1A:
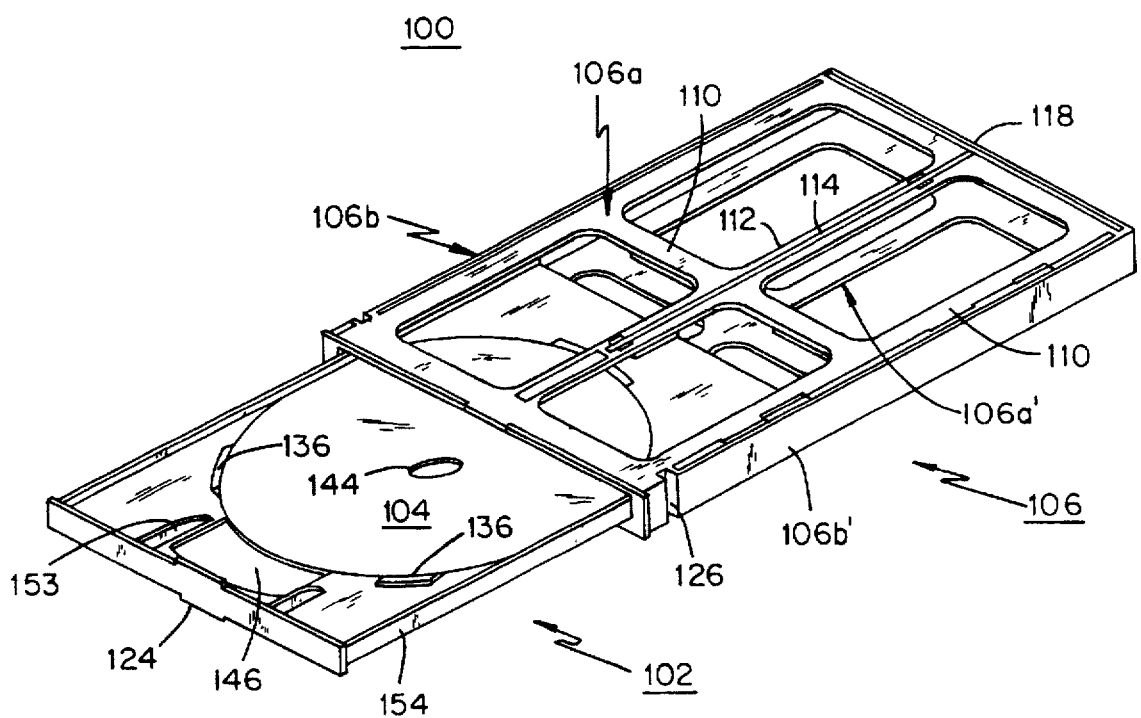
FIG. 1A illustrates a package and storage unit according to one embodiment of the present invention.

FIG. 1A illustrates a package and storage unit 100 according to first embodiment of the present invention. The unit 100 comprises a carrier tray 102, which includes a recess 104 to receive a disk (not shown). An endoskeleton/exoskeleton frame 106 includes slots 114 and parallel guide rails 116, illustrated in FIG. 2A, to allow the tray 102 to slide within the frame 106. Preferably, the carrier tray 102 and frame 106 are injection molded.

Figure 1B:
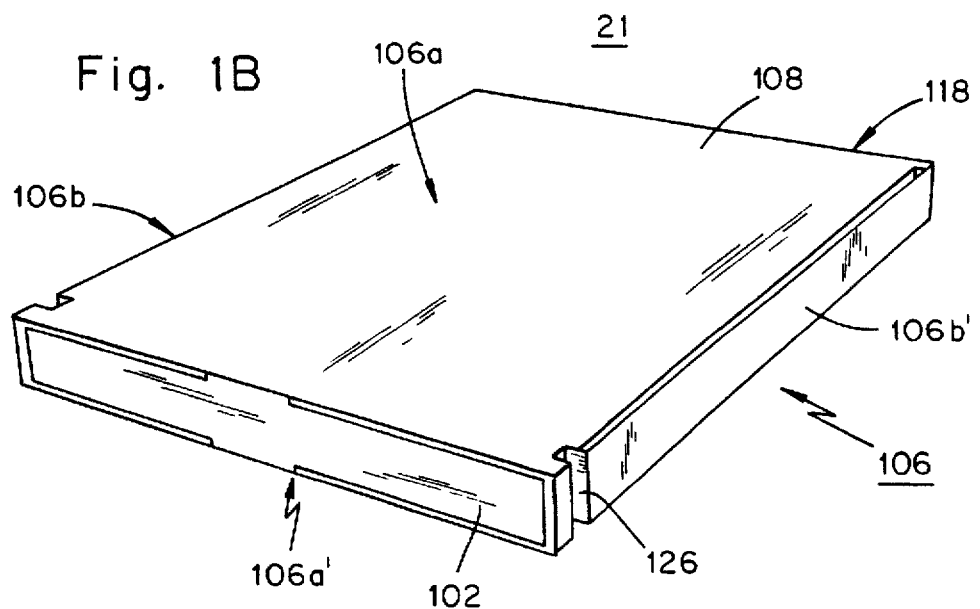
FIG. 1B illustrates a package and storage unit of FIG. 1A wrapped with a paperboard to form a case.

As illustrated in FIG. 1B, the endoskeleton/exoskeleton frame 106 allows a die cut paperboard 108 to be placed on the outside faces 106a and 106a', a side 106b and rear 118 of the frame 106. The outside area of the frame provides a sufficiently large area to place graphic materials such as text, 3-D graphics and/or holograms on the paperboard 108 to generate impulse sales. The graphic materials can be seen without the plastic cover layer of a conventional jewel box. The combination of the tray 102, the frame 106 and the paperboard 108 form a case 21 for packaging and storing a storage medium such as a CD, a DVD, or a similar information storage disk.

Figure 2A:
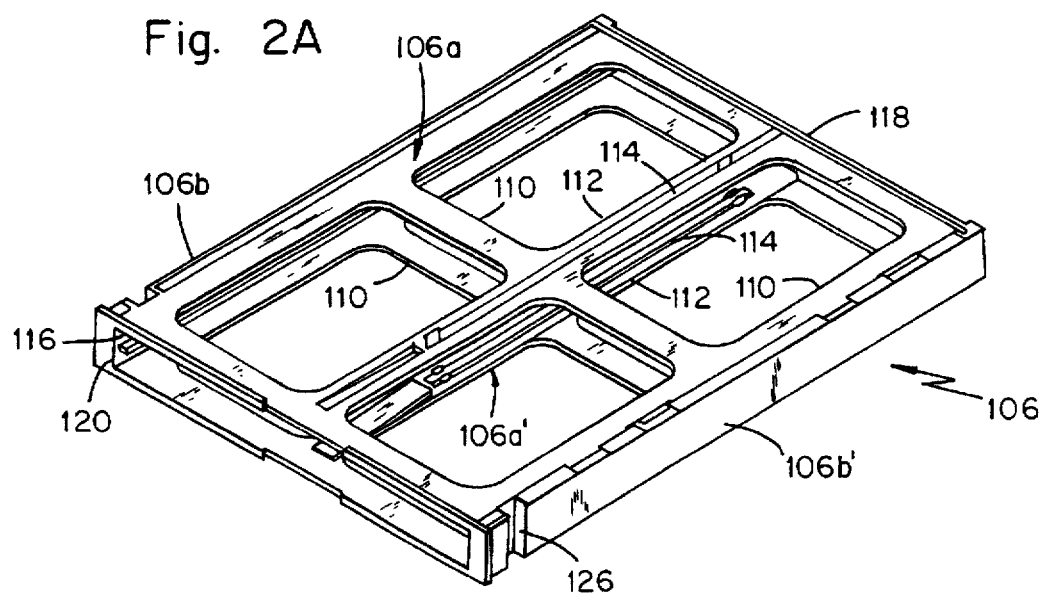
FIGS. 2A illustrates an endoskeleton/exoskeleton frame of the package and storage unit according to a first embodiment of the present invention.
Figures 2B, 2C:
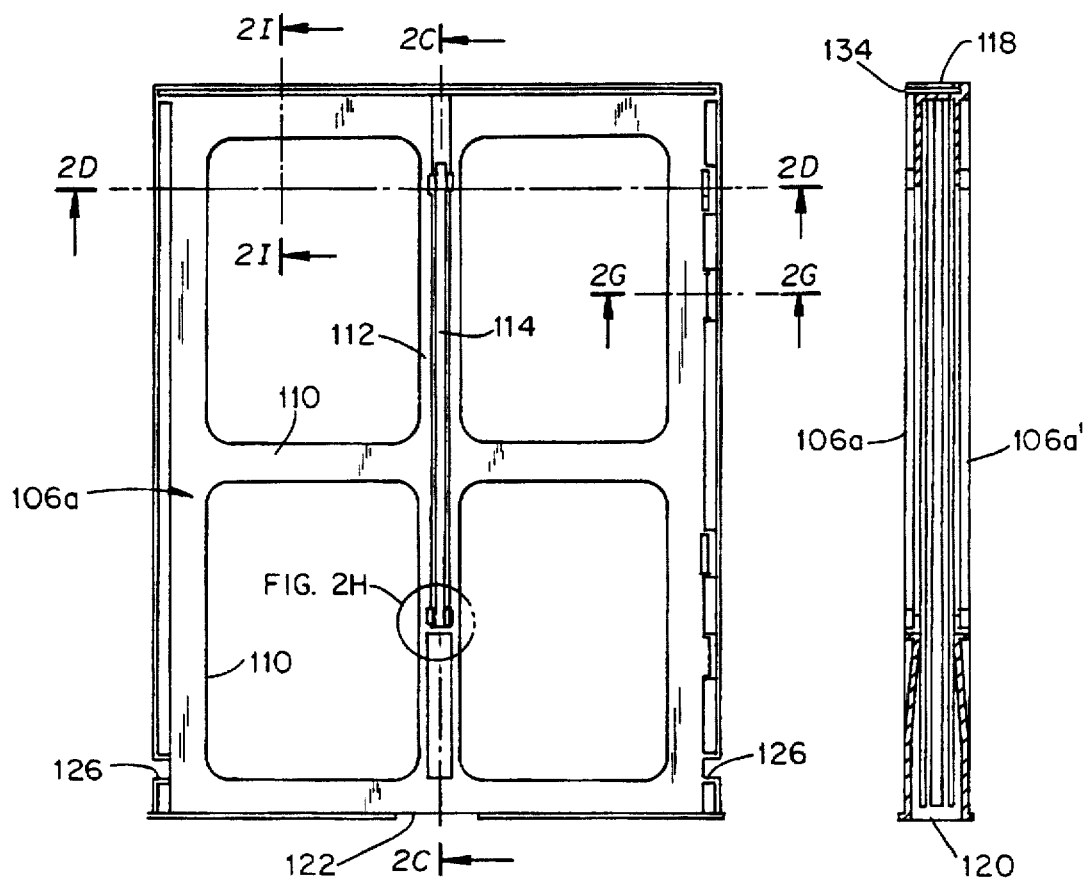
FIG. 2B illustrates a face of the frame illustrated in FIG. 2A.
FIG. 2C illustrates a sectional view along a line 2C—2C of FIG. 2B.

FIGS. 2A-2K illustrate in detail the endoskeleton/exoskeleton frame 106. Referring to FIGS. 2A to 2C, each of the faces 106a, 106a' of the frame 106 includes strips of molded plastic or a plurality of plastic portions 110 interconnected in a predetermined pattern to form the endoskeleton/exoskeleton frame 106. The strips or portions 110 provide a rigid support and reduce the amount of plastic needed for the frame 106. In certain other embodiments (not shown), the strips of plastic 110 can form a criss-cross pattern to form the endoskeleton/exoskeleton frame. Other modifications are possible to provide a rigid support to the frame 106.

To facilitate the slidable opening and closing of the carrier tray within the frame 106, each frame face 106a or 106a' includes a central strip 112 with a slot 114 and the interior of each side 106b and 106b ' of the frame 106 includes parallel guide rails 116. The central strip 112 and guide rails 116 guide the tray 102 within the frame 106 during opening and closing of the case 21.

Figure 1C:
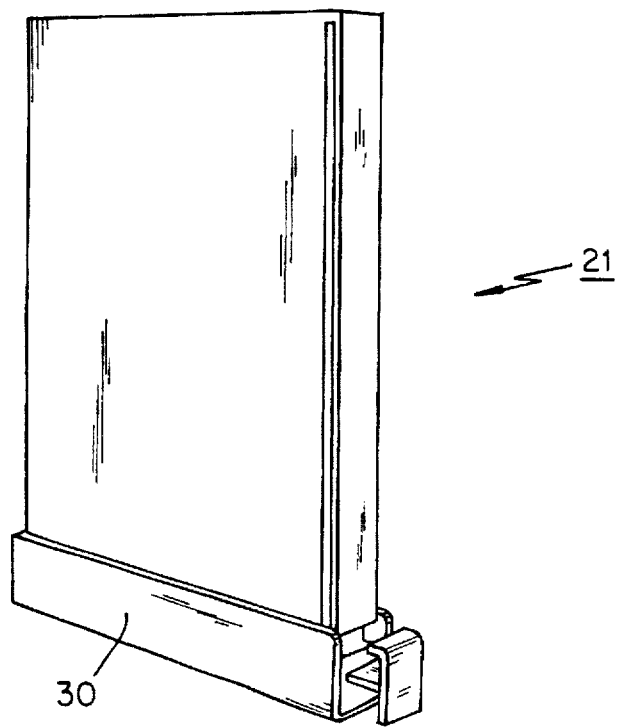
FIG. 1C illustrates a lock latched onto the case of FIG. 1B.

The frame 106 also includes a closed rear 118 and an open front 120 with an indention 122. The sides 106b and 106b ' of the frame 106 include notches or recesses 126 near the front of the frame 106. As shown in FIG. 1C, the recesses 126 are used for latching a lock 30 onto the case 21 (described in detail hereinafter).

Figure 2D:
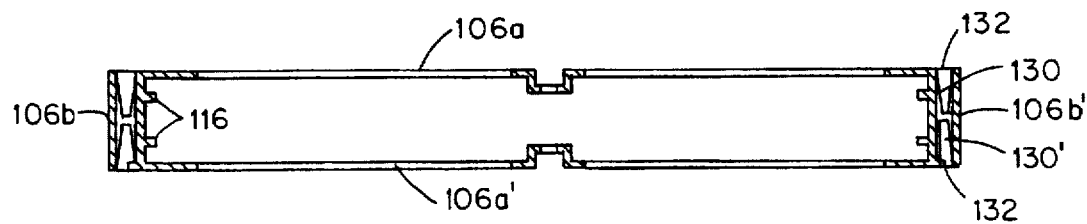
FIG. 2D illustrates a sectional view along a line 2D—2D of FIG. 2B.
Figure 2E:
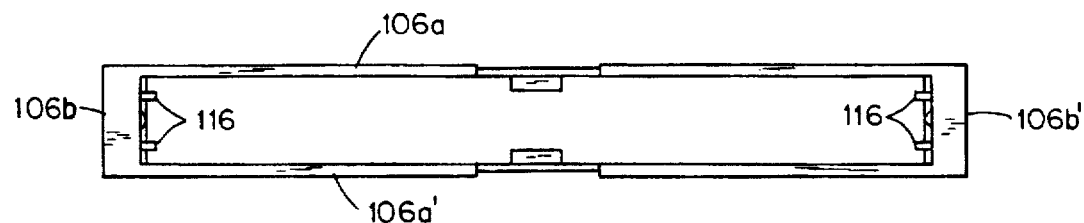
FIG. 2E is a front view of the frame illustrated in FIG. 2A.
Figure 2F:
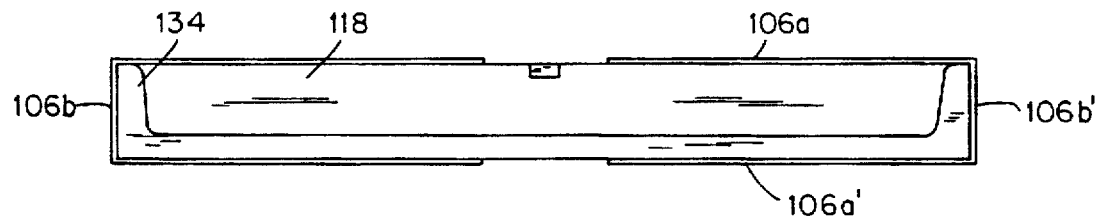
FIG. 2F is a rear view of the frame illustrated in FIG. 2A.
Figure 2H:
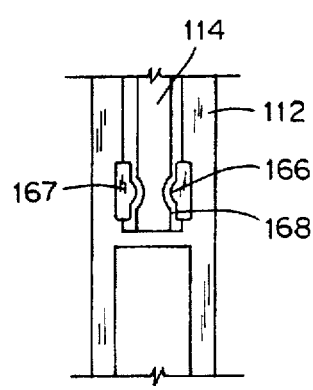
FIG. 2H is a detailed illustration of a retaining mechanism on the frame illustrated in FIG. 2B.
Figure 2G:
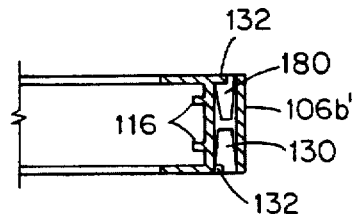
FIG. 2G is a sectional view along a line 2G—2G of FIG. 2B.
Figure 2I:
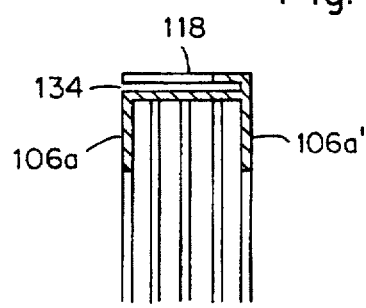
FIG. 2I is a sectional view along a line 2I—2I of FIG. 2B.
Figure 2J:
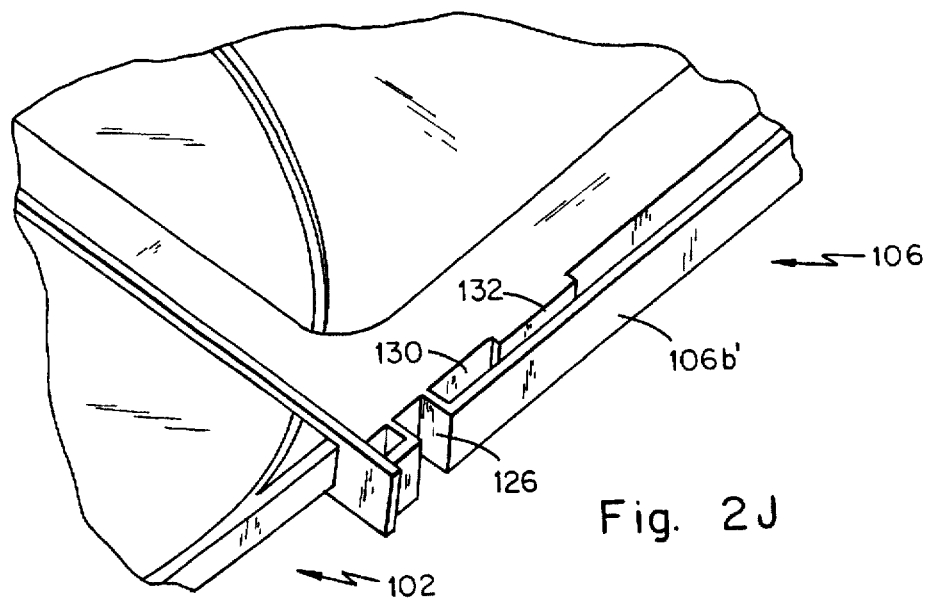
FIGS. 2J and 2K illustrate two detailed views of the cavity and protrusions for holding a folded edge of a paperboard to be wrapped around the frame illustrated in FIG. 2A.
Figure 2K:
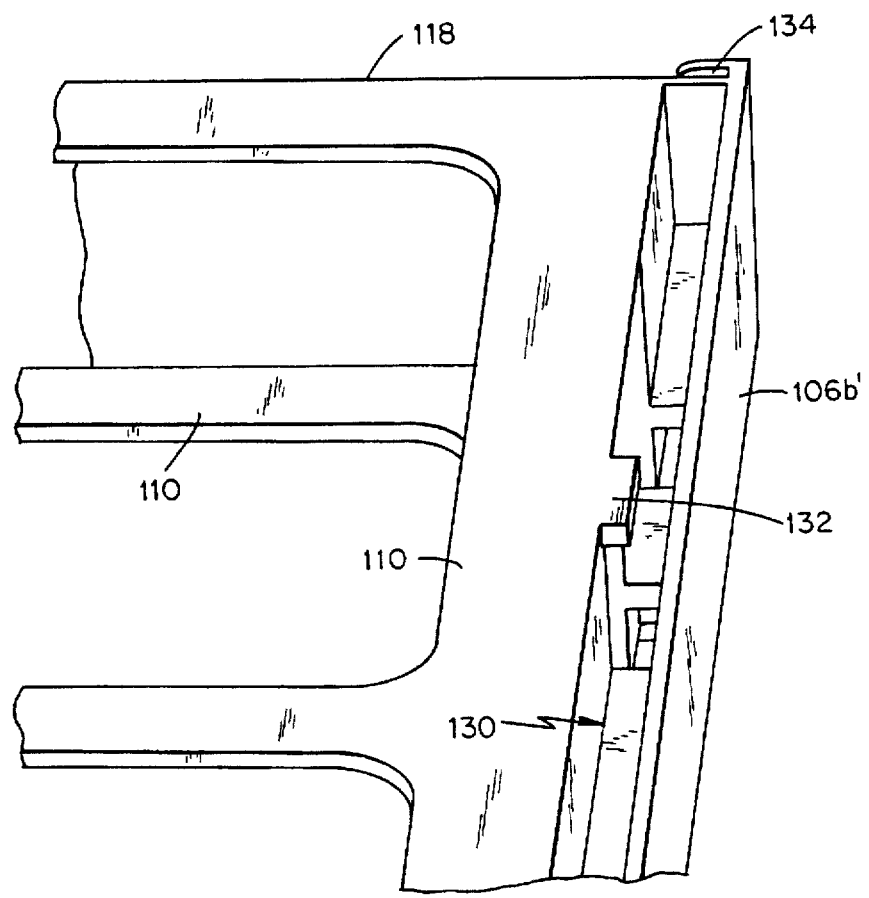
Figure 2L:
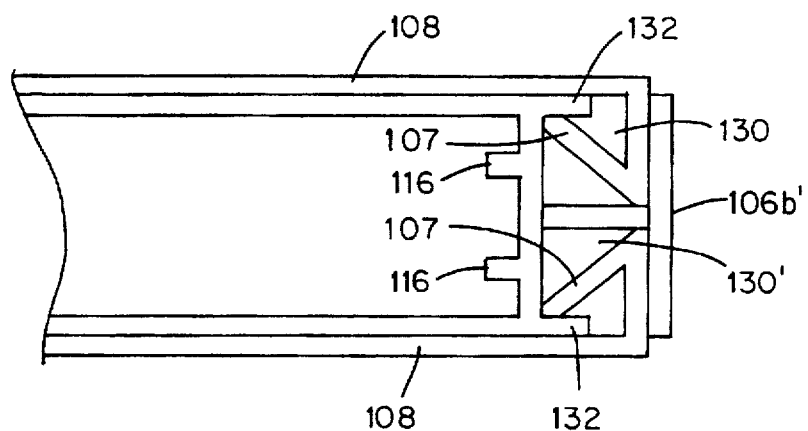
FIG. 2L is a view of an edge of the frame illustrating folded edges of the paperboard being held within the cavity and protrusions of the frame illustrated in FIGS. 2J and 2K.

FIGS. 2D, 2G, 2J, 2K and 2L illustrate an edge of the frame 106 which includes upper and lower recesses or cavities 130,130' and protrusions 132 to receive folded ends 107, 107' of the paperboard 108. When the ends of paperboard 108 are folded, there is a tendency for the folded ends 107, 107' to spring toward an unfolded position. As illustrated in FIG. 2L, such a tendency serves as a spring when folded ends 107, 107' of the paperboard 108 are inserted into the upper and lower cavities 130, 130' of the frame 106. The protrusions 132 serve as hooks to retain the folded ends 107, 107' inside the upper and lower cavities 130, 130'.

The paperboard 108 has folded side ends 107, 107' tucked into the upper and lower cavities 130, 130' to wrap the paperboard 108 with the graphics onto the faces 106a and 106a' and the side 106b of the frame 106. The folded rear edge of the paperboard 108 is inserted into a rear slot 134 (FIGS. 2I, 2K) to display the graphics on the rear of the frame 106. Adhesive can be used to further secure the folded rear edge of the paperboard to the closed rear 118 of the frame 106.

Such an arrangement is environmentally friendly since the endoskeleton/exoskeleton frame 106 can be reused for resale, when a disk is returned, by rewrapping the frame 106 with a new paperboard. As illustrated in FIG. 2D, similar upper and lower cavities 130, 130' can be provided on the opposing edge 106b of the endoskeleton/exoskeleton frame 106 for symmetry. Although not illustrated, protrusions 132 can be provided also, permitting the paperboard 108 to be wrapped in either direction.

FIGS. 3A-3E illustrate different views of the tray 102. The tray 102 includes a substantially circular recess 104 and center and front cutouts 144 and 146 to receive a disk. The recess 104 includes side openings 137. Two protrusions 136 are included at the side openings 137 of the circular recess 104. A spring 138 with a ledge or a lip 140 is located at an opening 142 near the rear of the tray 102.

The tray 102 also includes raised contours 148 on a top 150 and a bottom 152 of the tray 102 so that a center contour 147 is slidable within the slots 114 on the center strips 112 of the frame 102. The center contour 147 includes thick and thin portions 162 and 164 shown in FIG. 4A which engage an inverse contour 166/168 shown in FIG. 2H positioned at each end of the slot 114 of the frame 106 when the tray 102 is in an open or closed position within the frame 106. The sides 154 of the tray are sized such that the sides 154 are slidable within the parallel rails 116 of the frame 106. The top 150 and bottom 152 of the tray 102 also include parallel rails 153 to facilitate the slidable opening and closing of the tray 102 within the frame 106. The front of the tray 102 is sized such that it is flush within the interior front dimensions of the frame 106 in the closed position. When the tray 102 is in the closed position, the raised face portion 124 rests within the indention 122 of the frame 106 and serves as a tab for the user to grip the tray 102, as shown in FIG. 5A.

Figure 3A:
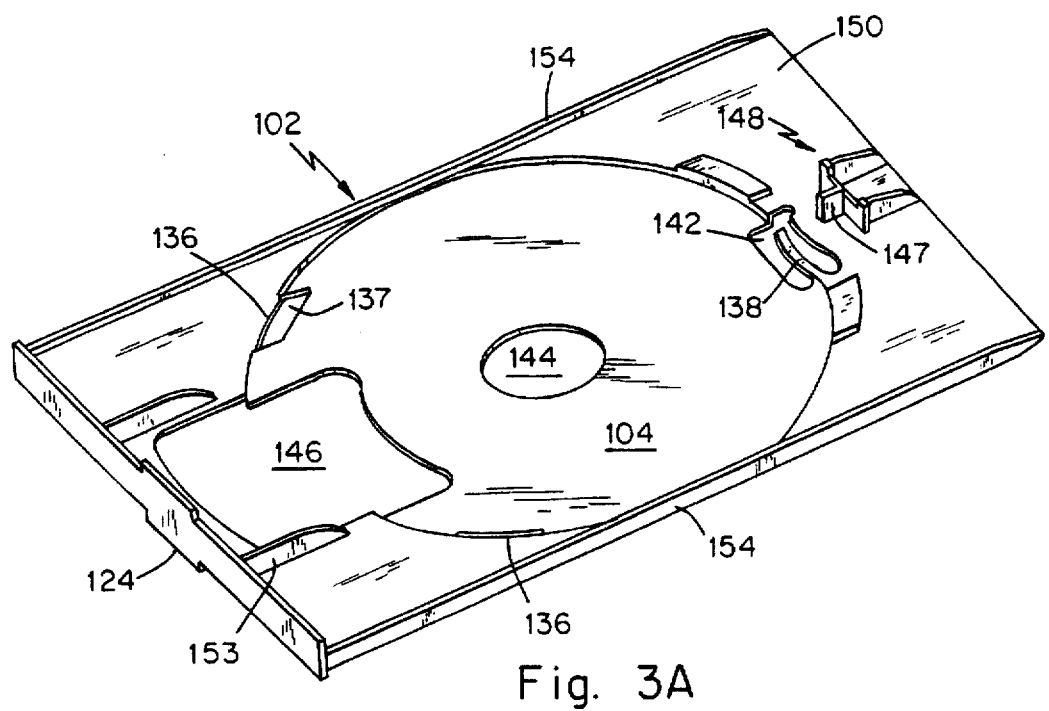
FIG. 3A is a top view of a tray according to a first embodiment of the present invention.
Figure 3B:
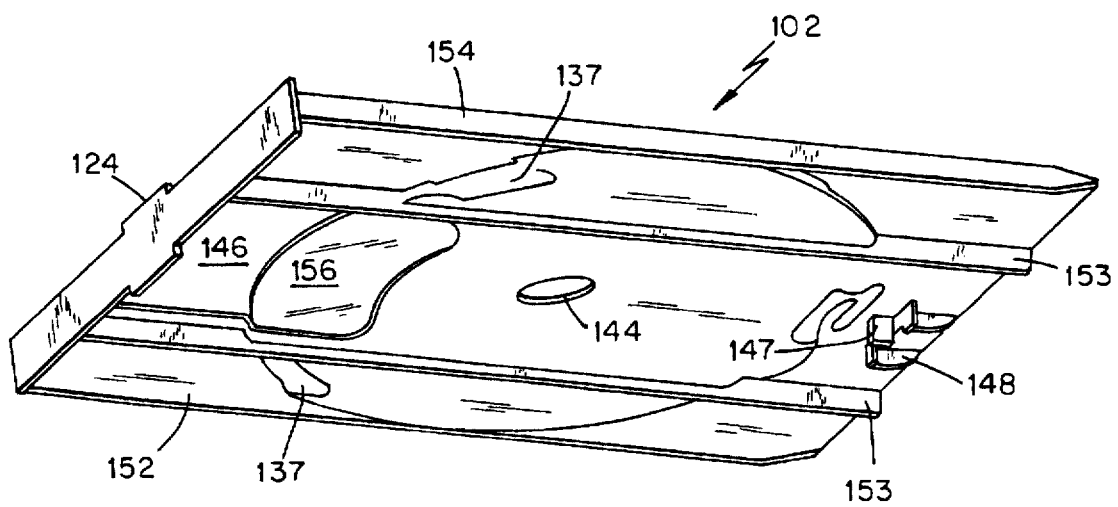
FIG. 3B is a bottom view of the tray illustrated in FIG. 3A.
Figure 3C:
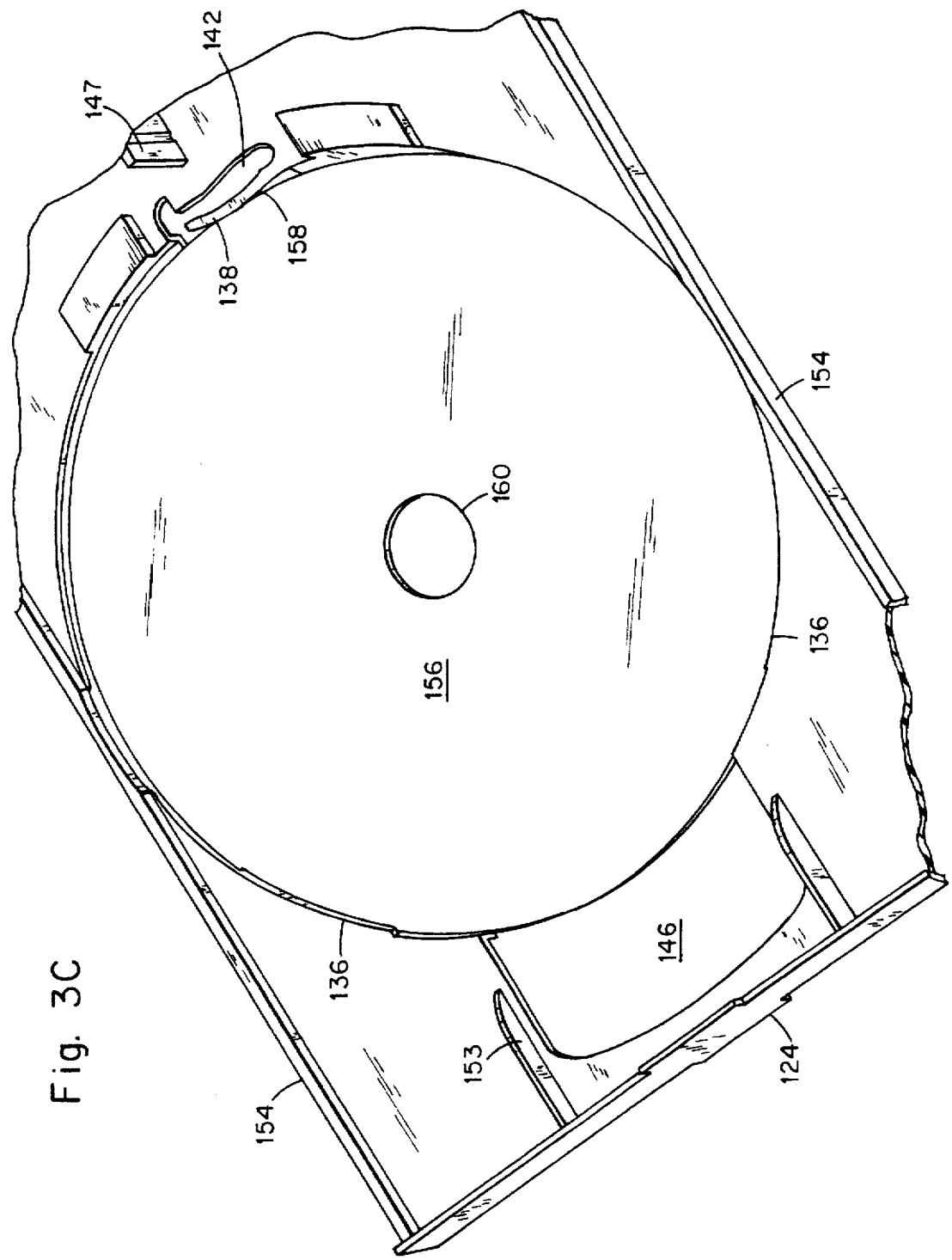
FIG. 3C is a top view of the tray with a disk retained in a recess of the tray illustrated in FIG. 3A.
Figure 3D:
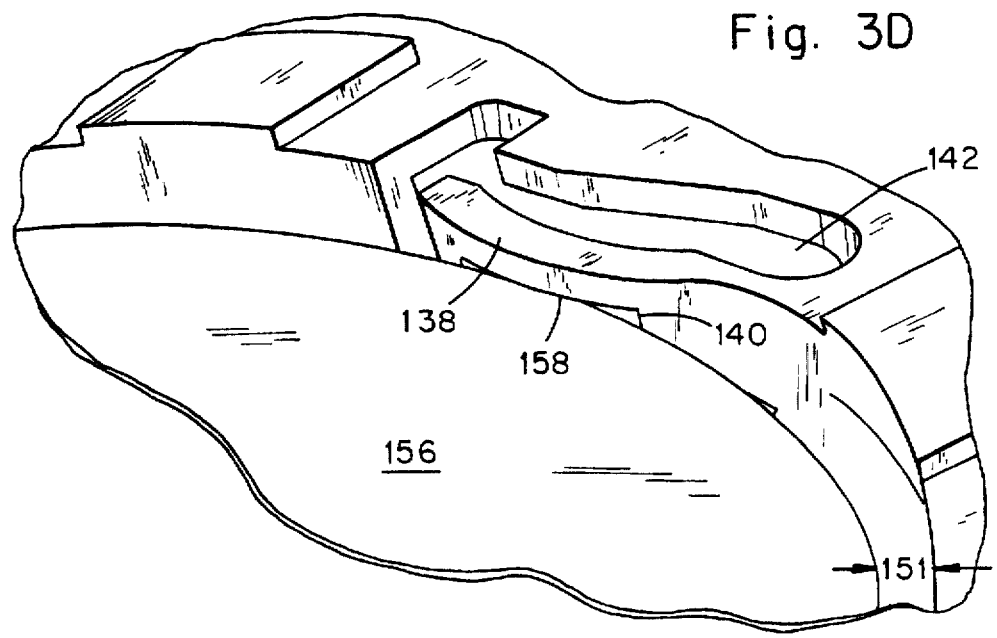
FIG. 3D is a detailed illustration of a spring on the tray illustrated in FIG. 3A.

As shown in FIGS. 3A and 3D, the spring 138 is preferably an arcuate arm with one end integral with the tray 102, i.e., the spring 138 is a cantilever spring. The spring 138 provides a biasing force toward the front of the tray 102 when a disk 156 is placed in the recess 104, and a ledge 140, i.e., a step contour of the spring 138, holds the disk 156 in the recess 104 in conjunction with the protrusions 136. Since the recess 104 has a slightly larger dimension than the disk 156, a gap 151 exists between the disk 156 and the recess 104. The gap 151 allows the disk 156 to slide in an appropriate direction when the user removes the disk 156 from the tray 102. While the spring 138 can be injection molded with the tray, it is also possible for the spring 138 to be attached to the tray using a screw, glue or other appropriate securing arrangements.

Figure 3E:
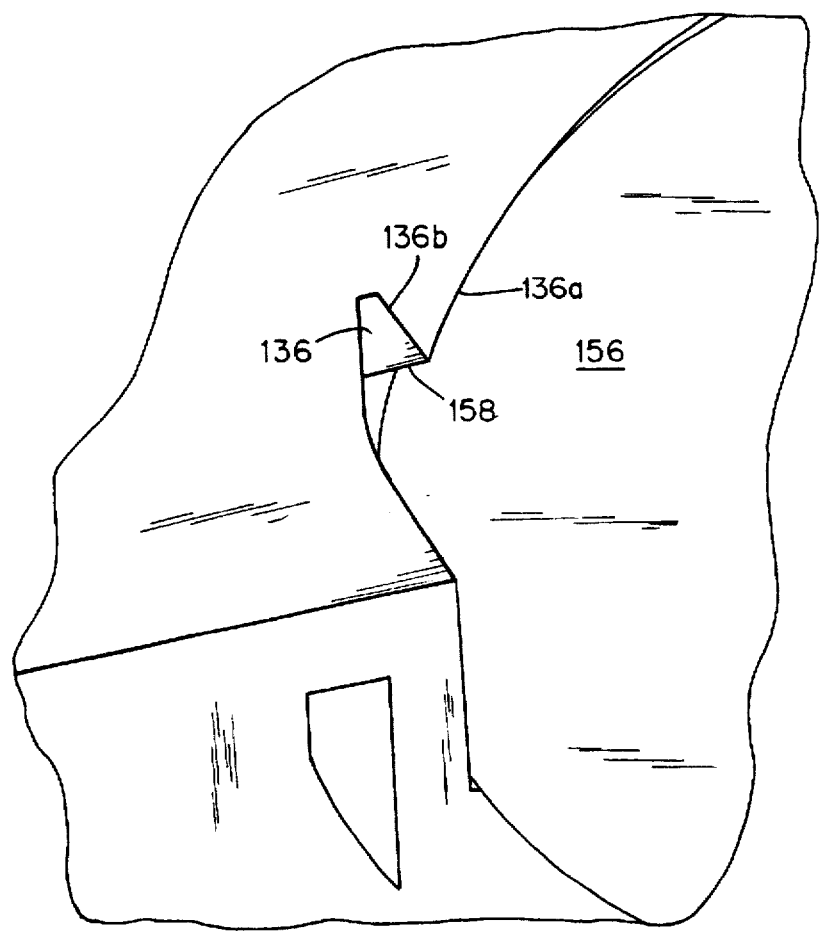
FIG. 3E is a detailed illustration of a protrusion on the tray illustrated in FIG. 3A.

FIG. 3E illustrates the details of one of the protrusions 136. The protrusions 136 slightly protrude into the recess 104. When the disk 156 is secured in the recess 104, the disk 156 is located beneath the protrusion 136 and maintained in this position due to the forward biasing force of the spring 138. When the user momentarily applies a force to offset the forward biasing force of the spring 138, the edges 158 of the disk 156 clear the edges 136a of the protrusions 136. Since the protrusions 136 have angled bevelled surfaces 136b, the disk 156 naturally moves upward and out of the recess 104 as the spring 138 applies a bias on the disk 156 after the brief application of the offsetting force by the user. With the disk 156 out of the recess 104, the user can easily remove the disk 156 from the tray 102.

Figure 4A:
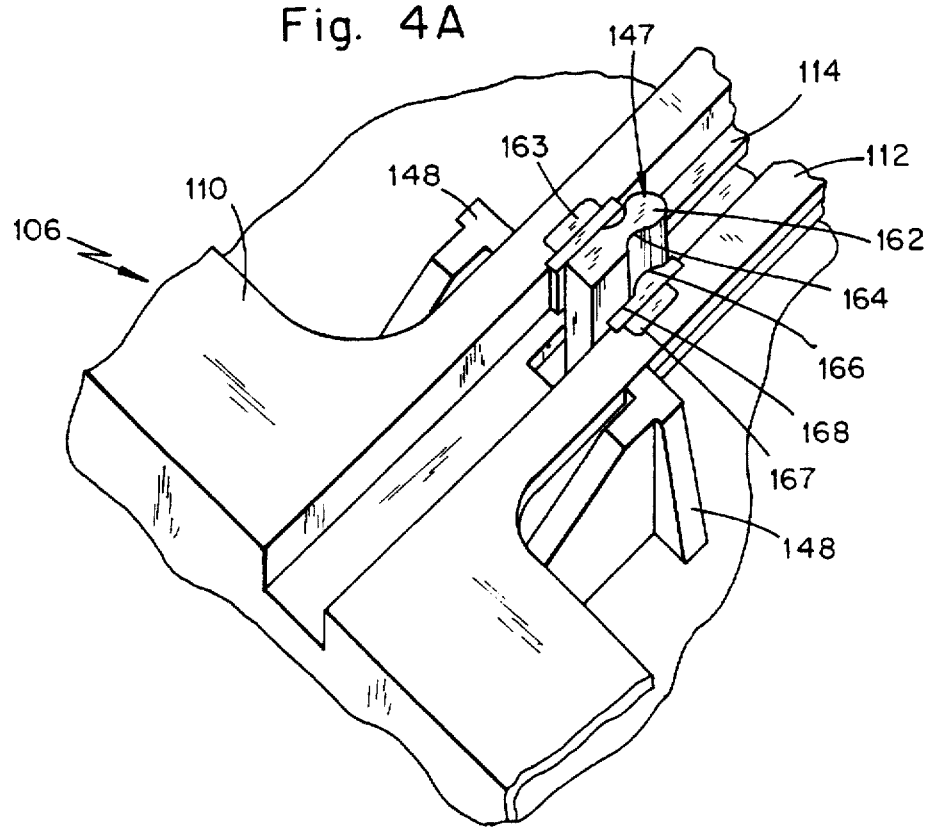
FIG. 4A illustrates in detail the latching of the raised portion of the tray, illustrated in FIGS. 3A and 3B, with a slot end of the frame, illustrated in FIG. 2H, having an inverse contour of the raised portion to hold the tray in an open or a closed position.
Figure 4B:
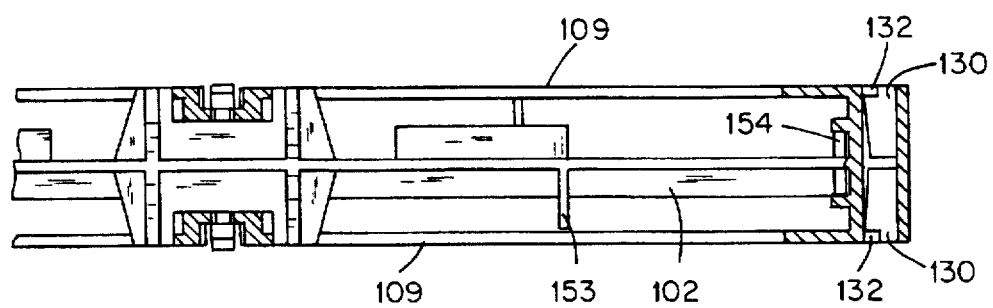
FIG. 4B depicts a cutout of the unit with the tray inserted into the frame illustrated in FIG. 1B.
Figure 5A:
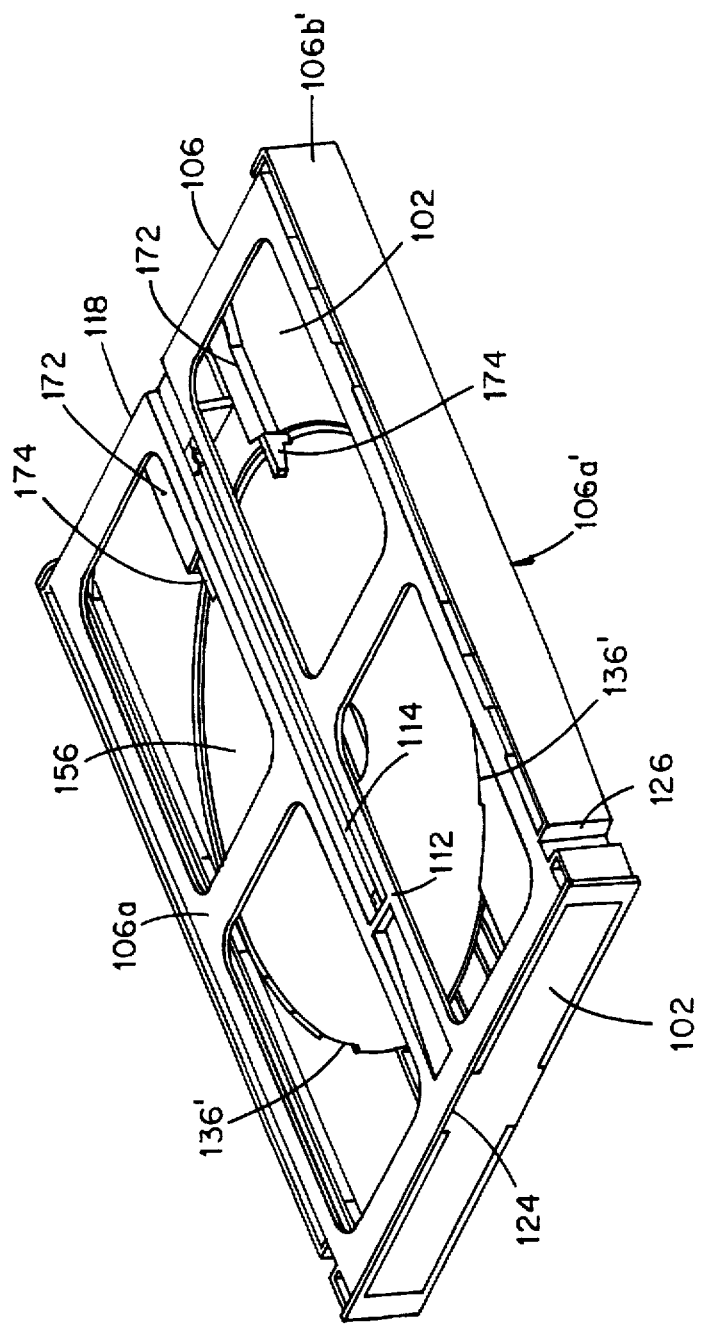
FIG. 5A illustrates a package and storage unit according to a second embodiment of the present invention.

Referring to FIG. 4A, the raised contours 147/148 of the tray 102 are illustrated positioned within the slot 114 of the frame 106. The center contour 147 includes thick and thin portions 162 and 164. The thick portions 162 are sized to be slidable in the slot 114 of the center strip 112. At each end, each side of the slot 114 has an inverse contour, i.e., curved and straight portions 166 and 168, of the center contour 147. One inverse contour is shown in FIG. 2H. To allow the inverse contour 166/168 to be flexible, cutouts 167 are provided on the central strips 112. The combination of each inverse contour 166/168 of the slot 114 and each cutout 137 functions as a retaining mechanism to latch the raised contour 147 of the tray. With the tray in either the open or closed position, the arrangement of the thick and thin portions 162 and 164 of the raised contours 147/148 fit snugly into the curved and straight portions 166 and 168 of the inverse contour, retaining the tray 102 open or closed. In this embodiment, the raised contours 147/148 are integral with tray 102, and are formed during injection molding of the tray 102. In other circumstances, the raised contours 147/148 can be separate and attached after the formation of the tray 102.

To close the tray 102 from the position shown in FIG. 1, the user applies a force to the to the front of the tray 102 towards the rear of the frame 106. When this is done, the thick portions 162 of the center contour 147 apply a force against the curved portions 166 (FIG. 4A). Due to the cutouts 167, the curved and straight portions 166 and 168 flex toward the sides 106b and 106b' such that the curved portions 166 are disengaged from the thin portion 164, and the thick portions 162 pass through the flexed curved and straight portions 166 and 168. When the tray approaches the closed position, continued application of the force by the user allows the thick portions 162 to pass through the flexed curved portions 166 until the curved portions 166 snap against the thin portion 164.

To open the tray 102 from the closed position shown in FIG. 5A, the user grabs the raised face portion 124 of the tray 102 and pulls outward. The lateral force exerted by the user releases the center contour 147 from the curved and straight portions 166 and 168 located near the rear of the frame 106. The user continues to pull on the face portion 124, and the sides 154 and thick portions 162 of the tray 102 glide on the rails 116 and slots 114, respectively, of the frame 106. The tray is pulled out from the frame 106 until the curved and straight portions 166 and 168 of the frame 106 snap or latch onto the thick and thin portions 162 and 164 of the tray 102.

Referring to FIGS. 3C–3E, once the tray is in an open position, to insert the disk 156, the user inserts one of his finger into the center 160 of the disk 156 and uses his thumb to grab the edge 158 of the disk 156. The user latches the edge 158 of the disk into the ledge 140 of the spring 138, and applies a force towards the rear of the tray 102 until the edge 158 of the disk 156 clears the protrusion 136. When the user releases the force on the disk, the forward bias of the spring 138 moves the disk 156 such that the disk 156 is latched in the ledge 140 of the spring 138 and beneath the protrusion 136, as shown in FIG. 3C.

As noted earlier and shown in FIGS. 3C–3E, the recess 104 has a slightly bigger dimensions than the disk 156. The spring 138 with the ledge (or a lip) 140 and the protrusions 136 securely hold the disk in the recess 104 for protection of the disk during shipment. The spring 138 and protrusions 136 do not interfere with the graphics on the disk 156 or scratch the critical areas of the disk 156.

To remove the disk 156 from the recess 104 of the open tray 102, the user inserts a forefinger in the center hole 160 of the disk 156 which aligns with the center hole 144 of the tray 102, and a thumb into the forward cutout 146 of the tray 102. When the user pushes the disk towards the rear of the tray 102 by an appropriate amount, e.g., 0.020 inches, the bevelled surfaces 136b of the protrusions 136 allow the disk to be naturally lifted out of the protrusions 136 in conjunction with the forward bias of the spring 138.

FIGS. 5A–5G illustrate a second embodiment of the present invention. A guide and pusher member arrangement 172/174 replaces the spring 138 of the first embodiment. A pair of pusher members 174 are located on a face of the frame 106 (see FIG. 5B), and a pair of guides 172 are located on the tray 102 (see FIG. 5C). As illustrated in FIG. 5D, the tray 102 of the second embodiment also includes a recess 104 comprised of a shelf or ledge 176 substantially surrounding a lower surface 178. An angled or bevelled wall 178a connects the lower surface 178 with the shelf 176. The lower surface 178 is sized to support the disk 156 at the outer periphery thereof, reducing the amount of surface area of the disk which is in contact with the tray 102.

Figure 5B:
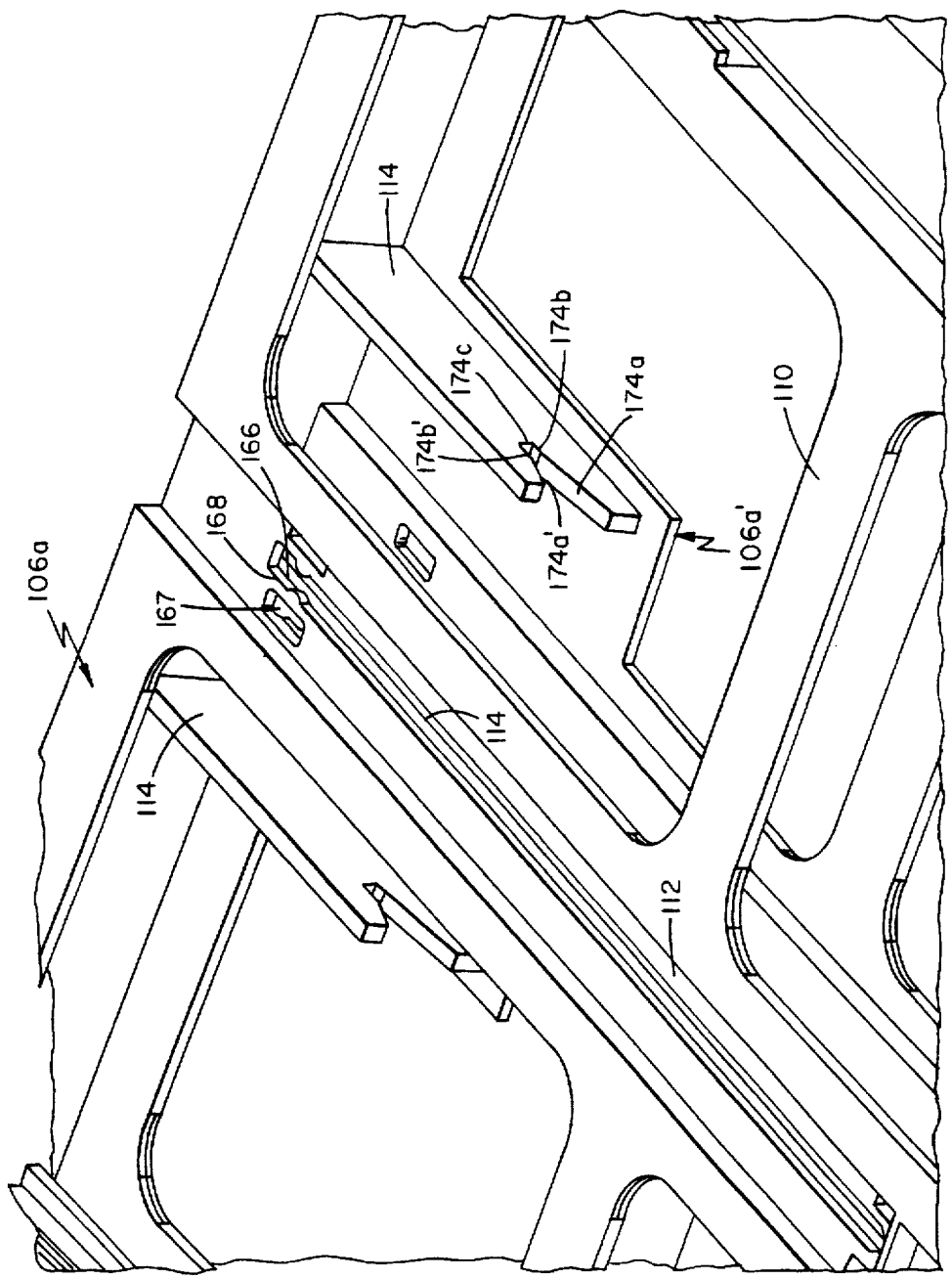
FIG. 5B illustrates a pair of pusher members on a frame illustrated in FIG. 5A.

FIG. 5B illustrates the details of the pair of pusher members 174 on the face of the frame 106. Each pusher member 174 has a stepped rib or finger like shape. The top and bottom front portions of the pusher member 174 have angled surfaces 174a and 174a'. The angled surface 174a at the bottom front portion has a longer length than the angled surface 174a' at the top front portion of the pusher member 174. The angled surfaces 174a and 174a' end at two parallel surfaces 174b and 174b' with a perpendicular wall 174c. The parallel surfaces 174b and 174b' and the perpendicular wall 174c form a slot to push the disk 156 as the tray 102 slides into the frame 106 and to hold the disk 156 within the recess 104 of the tray 102 at the closed position of the tray 102 within the frame 106 (described hereinafter).

Figure 5C:
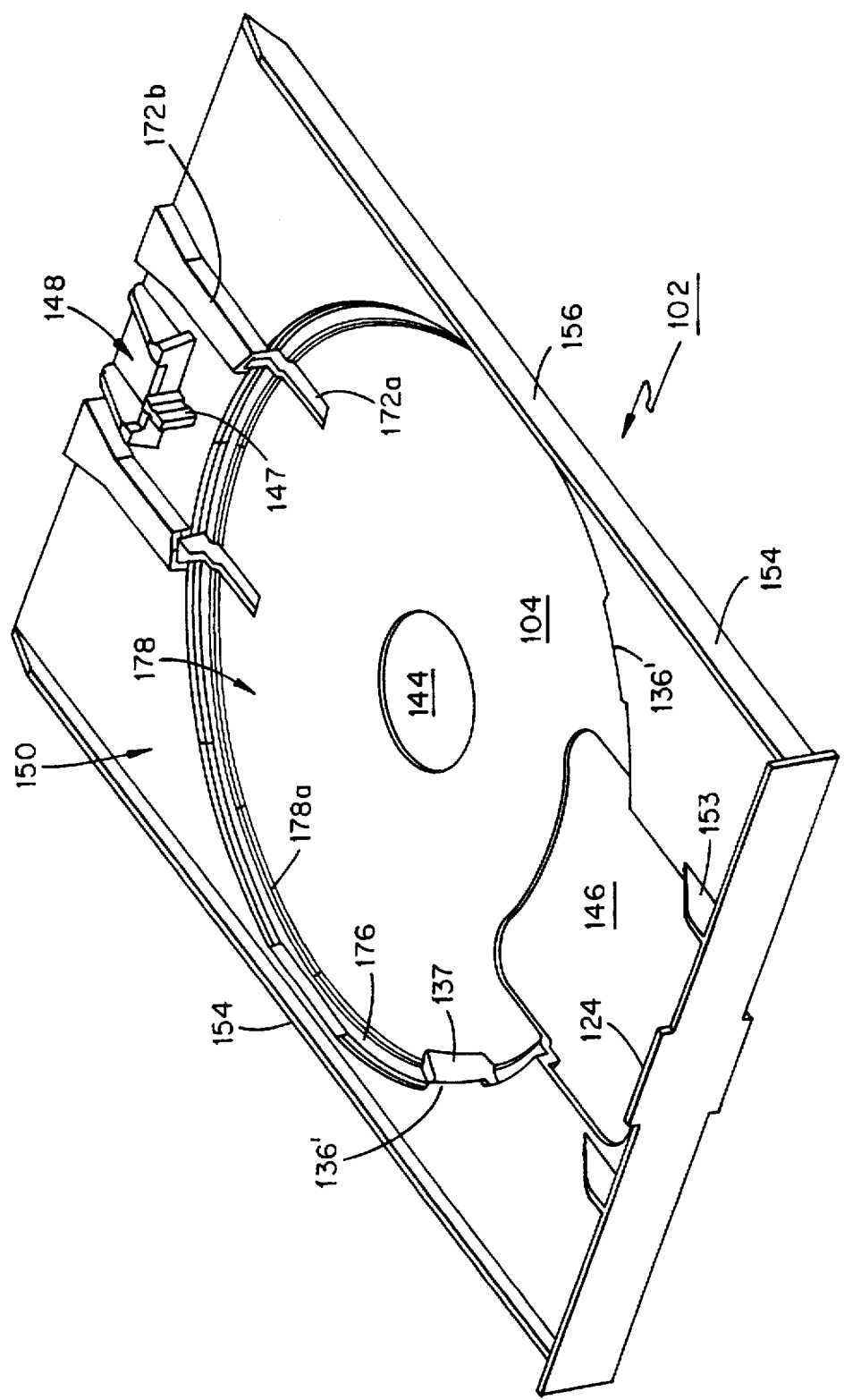
FIG. 5C illustrates a top view of a tray illustrated in FIG. 5A.
Figure 5E:
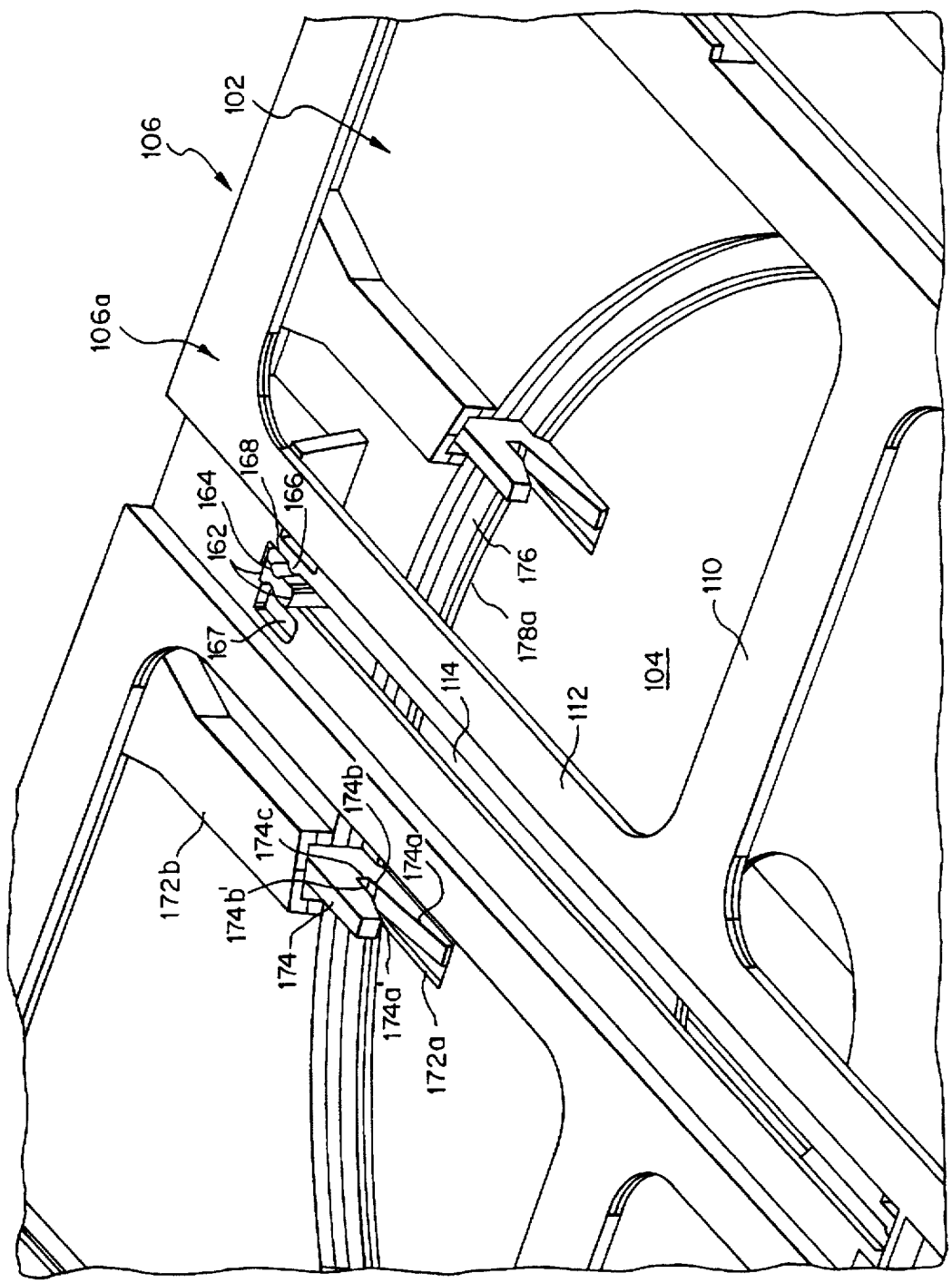
FIG. 5E illustrates the pair of guides guiding the pair of pusher members as the tray, illustrated in FIG. 5C, is inserted into the frame illustrated in FIG. 5B.

FIG. 5C illustrates the tray 102 of the second embodiment, and FIG. 5D is an exploded view of one of the protrusions 136, the shelf 176 and the lower surface 178 of the tray 102. The pair of guides 172 are parallel to each other, and each guide 172 includes an open rectangular cutout 172a in the recess 104 of tray 102 and a covered rectangular guide 172b as shown in FIG. 5C. The rear of the guide 172b is tapered to facilitate alignment of the pusher member 174 when the tray 102 is pushed into the frame 106 to the closed position.

As illustrated in FIG. 5D, the protrusion 136' is formed at the cutout 137 of the tray. Unlike the protrusion 136 of the first embodiment, the protrusion 136' does not have a bevelled surface. The protrusion 136' forms a ledge to trap the disk 156. At the final closed position of the tray 102 within the frame 106, the disk 156 is trapped between the shelf 176 and the protrusion 136'.

Figure 5F:
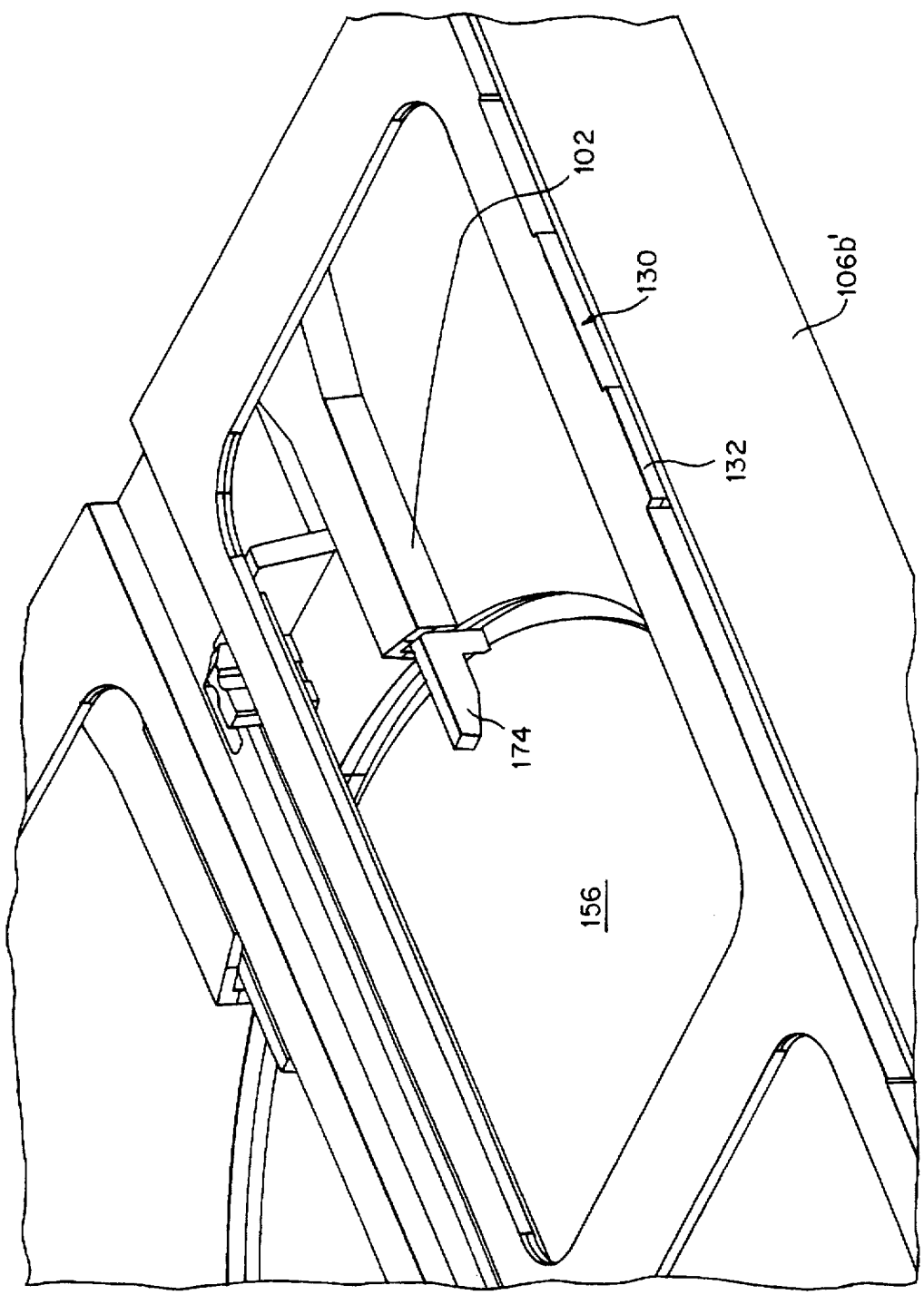
FIG. 5F illustrates the pair of pusher members engaging the disk to firmly secure the disk within the recess of the tray illustrated in FIG. 5C.

After a user has withdrawn the tray 102 from the frame 106 into an open position, as described above, the disk 156 is dropped in the recess 104. As the user pushes the tray 102 into a closed position within the frame 106, the pair of pusher members 174 slides within the pair of guides 172 (see FIG. 5E). Prior to the final closed position, the surfaces of the pair of pusher members 174 begin to contact the edge 158 of the disk 156. The continued movement of the tray 102 into the frame results in the disk edge being positioned between the parallel surfaces 172b and 172b', as illustrated in FIG. 5F.

Since the disk 156 is held between the parallel surfaces 174b and 174b' at the rear of the tray 102, the pusher members 174 push the disk 156 toward the front of the tray 102 by the movement of the tray 102 into the closed position. At the closed position, the edge of the disk 156 is trapped underneath the protrusions 136' near the front of the tray 102 while the pair of pusher members 174 push the edge of the disk 156 at the rear of the tray 102 towards the front of the tray (see FIG. 5G). Hence, the disk 156 is prevented from lifting out of the recess 104 of the tray 102 in the closed position.

To remove the disk 156, the tray 102 is opened. Since the pusher members 174 no longer engage the edge of the disk 156, the disk moves freely in the larger dimensioned recess 104. Therefore, the user merely inserts a forefinger in the center hole of the disk 156 and a thumb into the forward cutout 146, moves the disk slightly towards the rear of the tray 102 to clear the disk edge from protrusions 136, and lifts the disk 156 from the tray 102.

For retail sale of a disk using the first and second embodiments of the present invention, the disk 156 is placed on the tray 102 at an open position within the frame 106 (see FIG. 1). In the first embodiment of the invention, the spring 138 and the protrusions 136 hold the disk 156 within the recess 104, and the tray 102 slides in the frame 106 to a closed position (not shown).

Alternatively, in the second embodiment of the invention, the pair of pusher members 174 and protrusions 36' hold the disk 156 in the recess 104 (as shown in FIG. 5A). Prior to or after the insertion of the tray 102, a paperboard 108 including the graphics is folded, and the folded edges 107 and 107' of the paperboard 108 are tucked into the recesses 130 and slots 134 to wrap the paperboard 108 around the exterior of the endoskeleton/exoskeleton frame 106, as illustrated in FIGS. 1B and 2L. Thereafter, for both the first and second embodiments of the invention, the case 21 having the disk loaded tray 102 within the frame 106 is shrink wrapped with a thin film polymer. Once the case 21 arrives at the retail store, the retailer can attach the lock 30, as illustrated in FIGS. 1C and 6-8 and described hereinafter.

Figure 6:
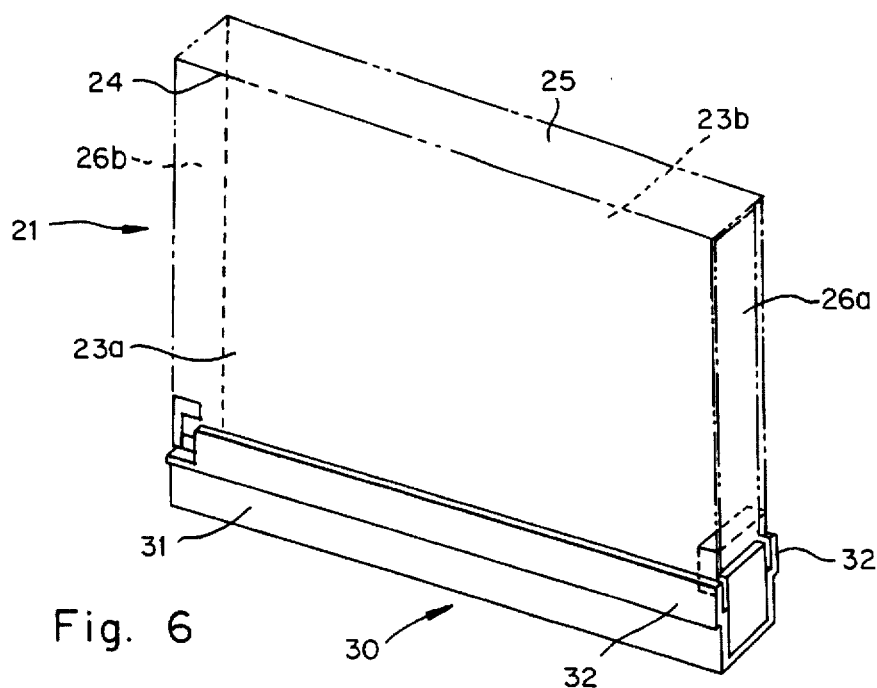
FIG. 6 is a perspective view of a security case of the present invention with the case latched.
Figure 7:
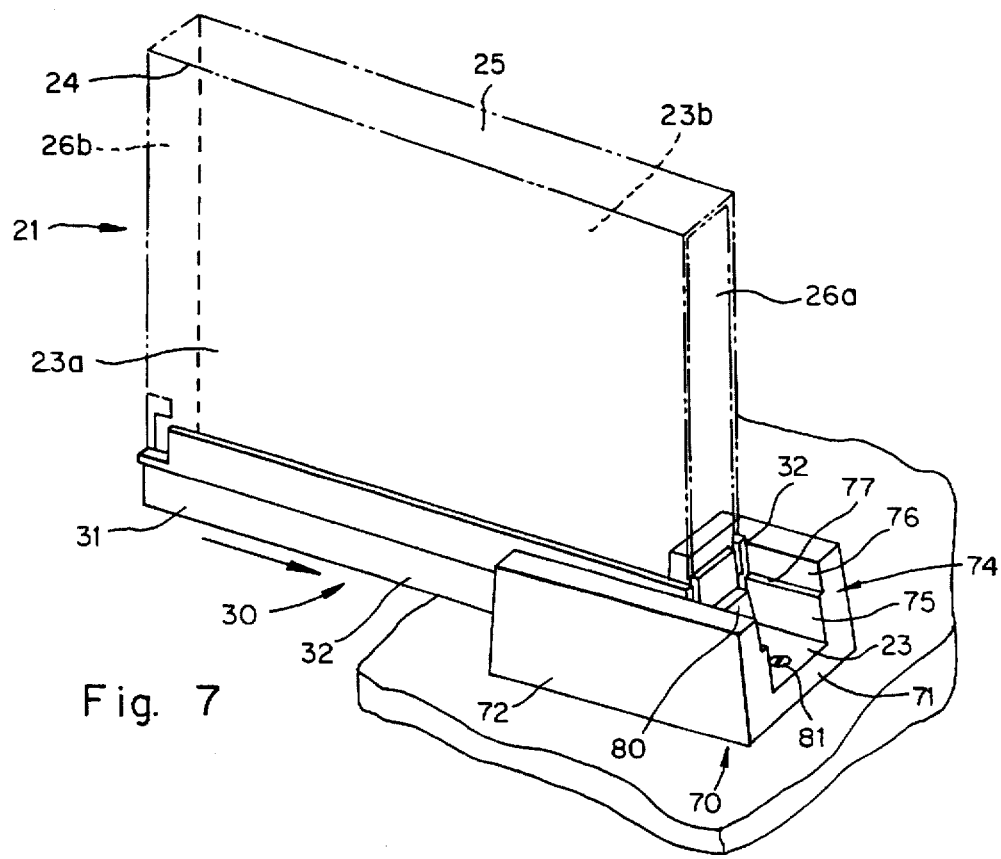
FIG. 7 is a perspective view of the security case with a locking mechanism engaging a locking mechanism decoupler.

Referring to FIGS. 6-8, a security case of the present invention includes the case 21 for holding merchandise, such as the disk 156, and a lock 30 for latching the case closed. While the disclosed embodiment assumes that CDs, or DVDs will be retained in the case 21, it should be readily apparent to those skilled in the art that other types of merchandise can be retained, and the present invention is not limited by the particular type of merchandise which is held in the case.

Figure 15:
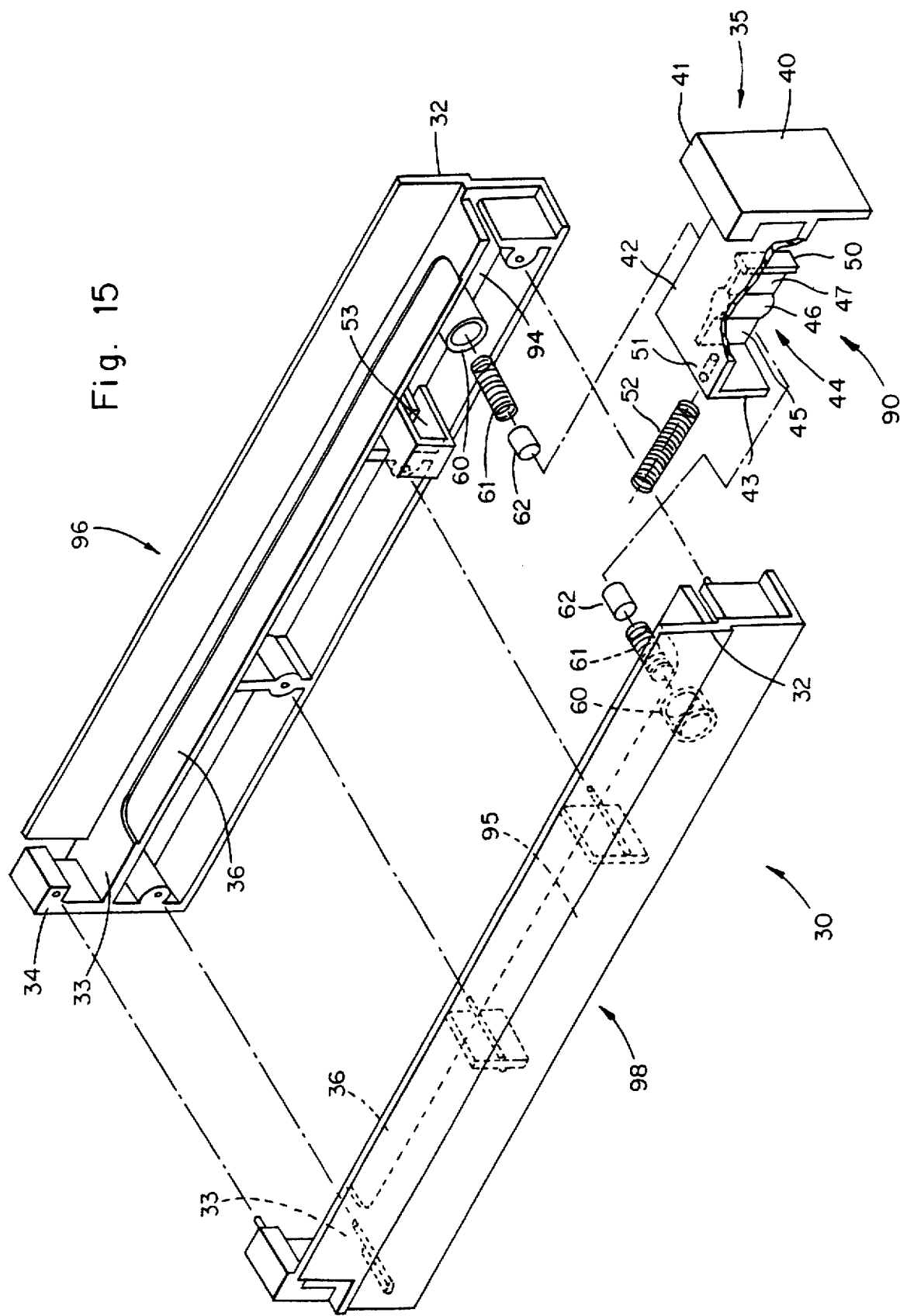
FIG. 15 is an exploded general perspective of the locking mechanism and actuator.

The lock 30 is constructed as shown in FIG. 15 with a housing 31, an actuator 90 at one end of the housing, and parallel flanges 32 extending from a cross-piece 33 of the housing 31. The housing is comprise of two portions 96 and 98 permanently connected to each other, for example by sonic welding. The portions 96 and 98 are substantially mirror images of each other, but portion 96 has a slot 53, to be described later, formed on an inner wall 94. The flanges 32 are spaced apart from each other by a distance slightly greater than the maximum width of the case 21. These flanges overlie a portion of the faces 23a and 23b of the case when the case is positioned on the cross-piece 33 of the housing 31. One end of the lock 30 has a fixed L-shaped hook 34 and the other end has a movable L-shaped hook 35.

The movable L-shaped hook 35 is part of an actuator 90 for latching the lock to a case, to be described later.

Figure 10:
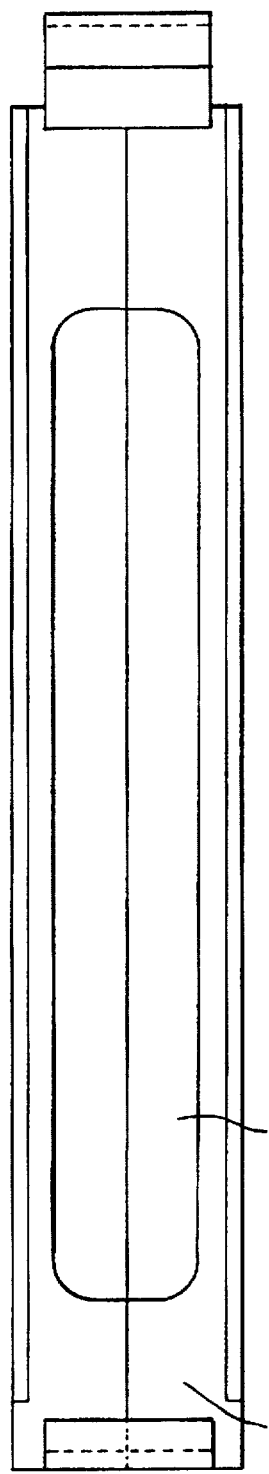
FIG. 10 is a top view of the locking mechanism illustrated in FIG. 9.

Referring to FIG. 10, cross-piece 33 of the housing 31 has a recess 36 designed to provide a location for a security strip to be used with the lock. When a security strip is placed in the recess 36 and the lock 30 is fastened to the case 21, the security strip is inaccessible to the customer and remains with the merchandise until the lock is removed. Thus, if a customer attempts to exit the store concealing case 21 with lock 30 fastened, an external alarm (not shown) will sound.

Figure 11:
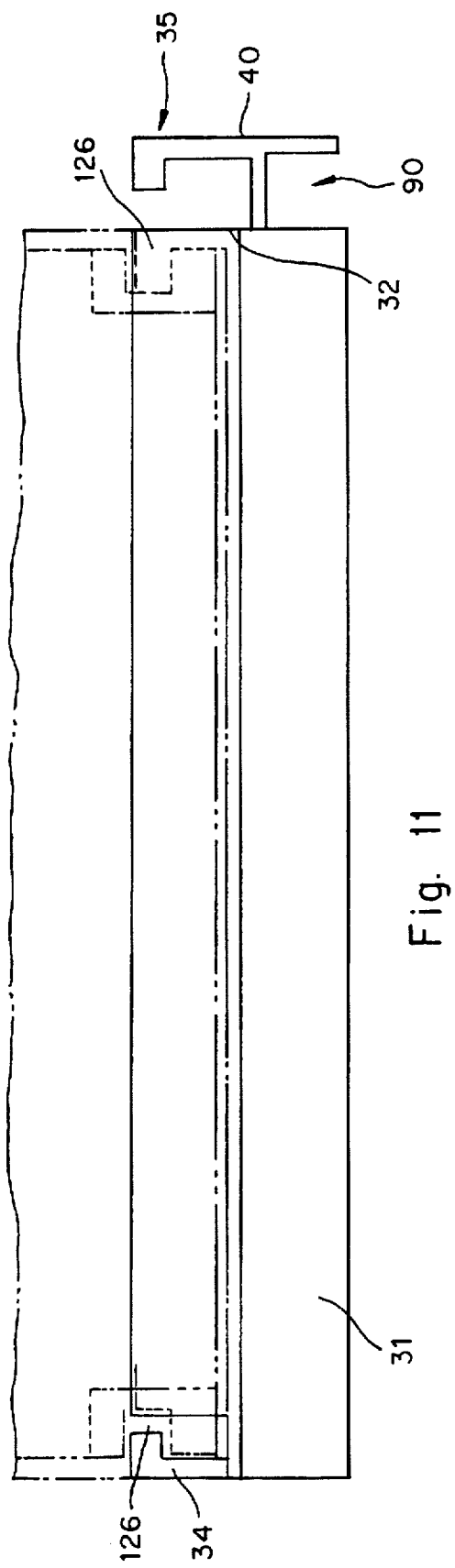
FIG. 11 is a side view of the locking mechanism illustrated in FIG. 10 unlocked from the case.

Both the fixed L-shaped hook 34 and movable L-shaped hook 35 engage the recesses or notches 126 of the sides when the lock is latched to the case as shown in FIG. 6. To fasten the lock 30 to the case 21, the case is first placed on the cross-piece 33 of the lock housing 31 and positioned so that the fixed L-shape hook 34 engages one of the recesses or notches 126 (FIG. 9). The actuator 90 is in the open position with the movable L-shaped hook 35 located as shown in FIG. 11, i.e., aligned to engage the other recess or notch 126. The actuator is then pressed to engage the movable L-shaped hook 35 in the other recess or notch 126. When the actuator reaches the closed position with the hook 35 now seated in the recess or notch 126, a mechanism (to be described hereinafter) locks the actuator in position, securing the lock 30 to the case 21.

Referring to FIG. 15, the actuator 90 and mechanism for locking the actuator in position is described. The actuator 90 comprises the L-shaped hook 35, a portion 42 extending inward from the L-shaped hook and another portion 43 extending downward. External portions 40 and 41 form the L-shaped hook with portion 41 extending parallel to the cross-piece 33. The portions 42 and 43 of the actuator 90 move longitudinally between the ends of the lock 30 beneath the cross-piece 33 when the actuator is opened or closed. Another cross-piece 44 formed beneath the actuator portion 42 has one end attached to actuator portion 43 with the other end extending a prescribed distance towards the hook portion 40. A wall 50, parallel to the portions 40 and 43, is formed at the other end of the cross-piece 44.

A protrusion 51 extending from the actuator portion 43 towards the fixed L-shaped hook 34 is adapted to receive a spring 52. The spring 52 fits over the protrusion 51 and has one end resting against the portion 43. The other end of the spring rests against a back surface of the slot 53 formed between the inner walls of the housing 31. The length of the portion 51 is designed so that the free end of the protrusion does not strike the back surface of the slot 33 when the actuator is in the closed position.

Sleeves 60 are formed on opposing sides of the inner walls 94 and 95 of the housing 31. Each sleeve, adapted to receive a spring 61 and steel pin 62, allows the steel pin under load from the spring to freely engage the cross-piece 44. The length of each steel pin is such that the pin does not extend beyond the outer edge of the sleeve when the spring 61 is fully compressed.

The shape of the cross-piece 44 between the wall 50 and the portion 43 is designed to facilitate latching of the actuator using the spring loaded steel pins 62. In particular, each side of the cross-piece 44 has, in succession, a flat segment 45, a curved segment 46, and another flat segment 47. The curvature of the segment 46 is greater at the junction to the flat segment 47 than at the junction to the flat segment 45. The wall 50, the flat segment 47, and the junction between the flat segment 47 and the curved segment 46 form a seat on each side of the cross portion 44 for the steel pins 62. When the actuator is in the closed position, the steel pins are retained in the seats by the force exerted by the springs 61.

Figure 12A:
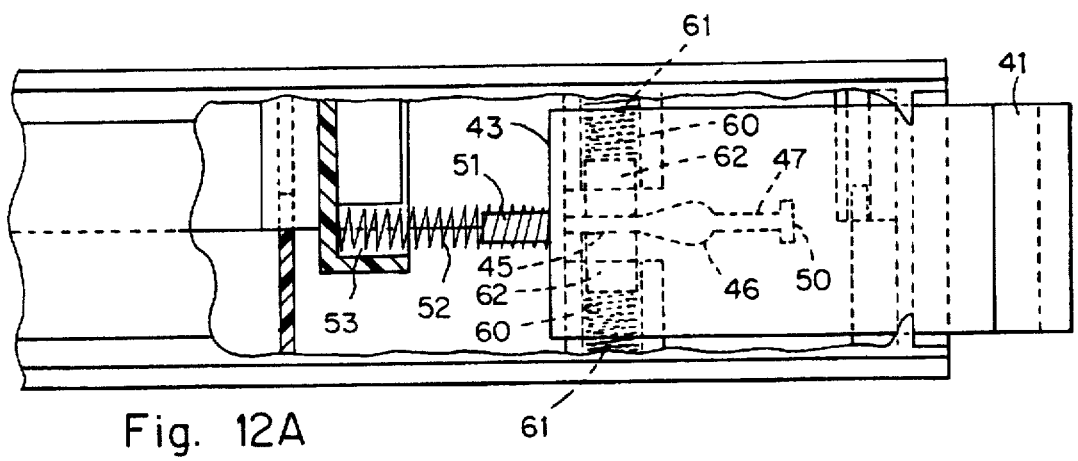
FIGS. 12A to 12C are sectional views of the bottom of the locking mechanism illustrated in FIG. 10 showing an actuator progressing from an open to a closed position.
Figure 12B:
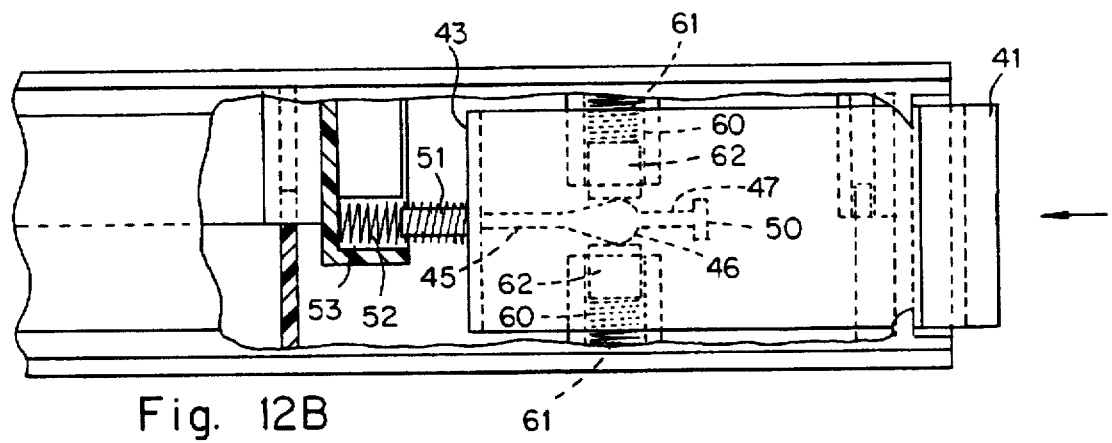
Figure 12C:
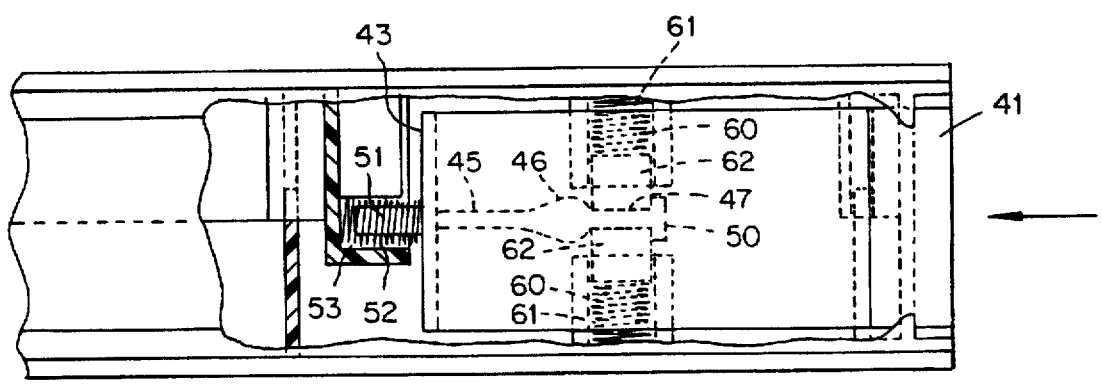

Referring to FIGS. 11-12C, the operation of the mechanism for latching the actuator closed will be described. When the actuator 90 is open (FIG. 11), the movable L-shaped hook 35 extends beyond the ends of the flanges 32, the spring 52 is almost fully decompressed and the springs 61 are less than fully compressed. The load of the springs 61 forces the steel pins 62 to rest against the flat segments 45. When a lateral force is applied to the portion 40 manually, the movable L-shaped hook 35 is forced towards the fixed L-shaped hook 34, further compressing the spring 52. At the same time, the steel pins 62 move along the curved segments 46, further compressing the springs 41 as shown in FIG. 12B. As the actuator moves to the closed position, the spring 52 continues to compress, and at the same time, the springs 61 decompress slightly, rapidly forcing the steel pins 62 into the seats formed by the wall 50, the flat segment 47, and the junction between the flat segment 47 and the curved segment 46. The load exerted on the portion 43 by the compressed spring 52 causes an outer edge of each of the steel pins 62 to rest against the junction between the curved segment 46 and the flat segment 47. When the actuator is closed, with the L-shaped hooks 34 and 35 engaging the recesses or notches 126 of the case 21, the lock 30 cannot be removed from the case as the force exerted on the steel pins 62 by the springs 61 lock the steel pins in their seats.

Referring now to FIGS. 7, 8, 13 and 14, a decoupler 70 for releasing the actuator has a U-shaped housing which is positioned near a counter. Screws 81 (only one is shown) are used to fasten the decoupler to the counter, although other suitable means for fastening may be employed. The decoupler 70 has a base 71, outer surfaces 72, a flat surface 73, and inner surfaces 74 extending from the flat surface 73. The inner surfaces 74 each have a first portion 75 and a second portion 76 perpendicular to the surface 73. The distance between the first portions 75 is slightly greater than the width of the housing 31 of the lock 30, and the distance between the second portions 76 is slightly greater than the width of the flanges 32. This arrangement results in the formation of ledges 77. Because the flanges 32 of the lock 30 are wider than the base 31, the lower surfaces of the flanges 32 ride on the ledges 77 during a release operation.

A magnet 78 is positioned in the decoupler 70 between each outer surface 72 and the first portion 75 of each inner surface 74. A vertical cross rib structure 80 is attached to the flat surface 73. Both the position of the magnets in the decoupler and the position of the vertical cross rib structure 80 on the flat surface 73 are arranged so that, during the release operation, the outer surface of the portion 40 of the actuator engages the vertical cross rib structure as the steel pins 62 align approximately with the center of the magnets 78.

Figure 13:
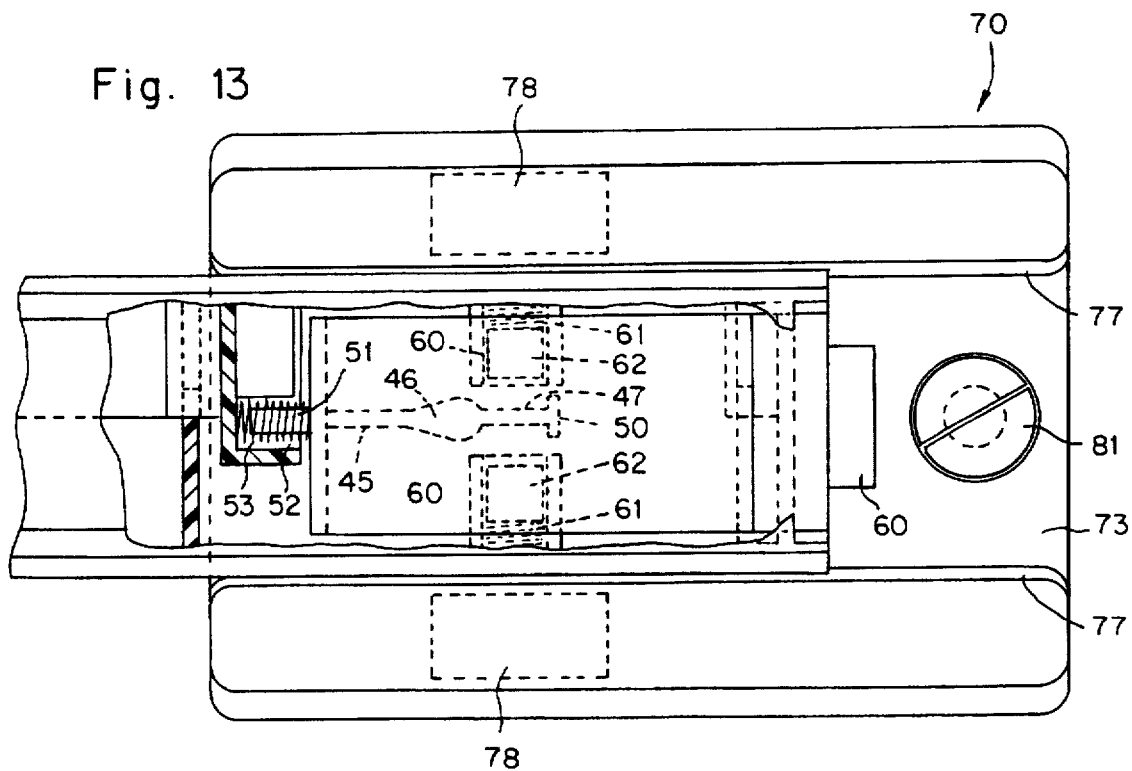
FIG. 13 is a sectional view of the security case illustrated in FIG. 8 of the present invention showing the actuator being unlocked by the decoupler.
Figure 14:
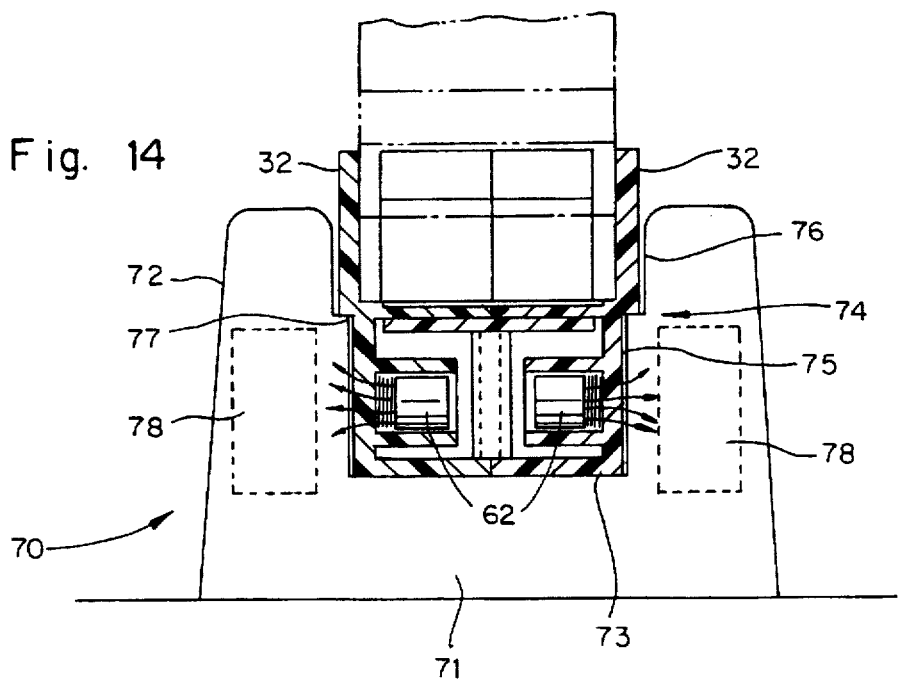
FIG. 14 is a sectional view of the end of the security case showing the actuator being unlocked by the decoupler.

Referring to FIGS. 7, 13 and 14, the release operation for the actuator 90 using the decoupler 70 is described. The lock 30, fastened to the case 21, is brought in contact with the decoupler by placing the housing 31 on the flat surface 73 with the outer surface of the portion 40 facing the vertical cross rib structure 80. As noted above, the lower surfaces of the flanges 32 will ride on ledges 77 during the release operation. Next, the latched case is swiftly moved in a horizontal direction towards the vertical cross rib structure 80. This swift movement results in sharp contact between the outer surface of the portion 40 and the vertical cross rib structure. The sharp contact further compresses the spring 52, allowing the outer edges of the steel pins 62 to move away from the junction between the flat segment 47 and the curved portion 46 in each of the seats. This small movement is shown in FIGS. 12C and 13 as a slight shift in position of the steel pins 62. With the position of the steel pins 62 shifted, the force of each spring 61 on a corresponding steel pin is isolated, allowing the magnets 78 to draw the pins toward the sleeves, releasing the actuator. With the actuator released, the force exerted by the spring 52 on the portion 43 moves the actuator to an open position.

While the present embodiment uses the spring 52 to bias the actuator 90 to the open position, the spring is not required. Without the spring 52, the outer edge of each of the steel pins 62 is not forced to rest against the junction between the curved segment 46 and the flat segment 47 when the actuator is in the closed position. This eliminates the need for swift movement of the latched case towards the vertical cross rib structure 80.

To release the actuator 90, the decoupler 70 is mounted vertically with an outer surface of the rib structure 80 facing downward and the outer surface of the hook portion 40 of the lock 30 is brought in contact with the vertical cross rib structure 80 of the decoupler. The lower surfaces of the flanges 32 of the lock 30 should be on ledges 77 of the decoupler. In this position, the magnets 78 draw the pins toward the sleeves 60, releasing the actuator. Gravity holds the released actuator against the vertical cross rib structure 80. To position the actuator in the open position, the case 21, attached to the lock 30 by L-shaped hook 34, is moved vertically upward along the ledges 77 of the decoupler 70.

There accordingly has been described a security device for protecting displayed merchandise from theft using a case to receive the merchandise and a locking mechanism latching the case. The case and locking mechanism provide protection for CDs or DVDs in a live merchandising format without increasing inventory space. The locking mechanism has a cross-piece with a recessed surface for a security strip and when the locking mechanism latches the case closed, the case is positioned on the cross-piece, making the security strip inaccessible to customers. Such a security device is disclosed in U.S. patent application Ser. No. 08/398,280. However, as the dimensions of the storage units for DVDs differs slightly from the case disclosed in U.S. patent application Ser. No. 08/398,280, the locking mechanism is appropriately sized. If necessary, the location where the steel pin locks the actuator can be offset by about 1 inch from the prior application design.

The foregoing embodiment is merely exemplary and not to be construed as limiting the basic concept of the package and storage unit. Moreover, while a disk for storing audio and/or video information has been exemplified, the invention is not so limited, and can easily be applied to other industry for packaging and storing storage media of existing and emerging technologies.

I claim:

1. A frame having an open front for receiving a tray holding an information storage disk, the frame being capable of being wrapped by a paperboard, comprising:

first and second main faces;

first and second lateral sides connecting said first and second main faces;

a rear end opposing the open front, and connecting said first and second main faces and the first and second lateral sides;

a slot in at least one of the first and second main faces configured to engage a raised contour of the tray, the raised contour of the tray to be slidable in said slot; and a paperboard holding arrangement such that the paperboard wrapped on exterior surfaces of the first and second faces and first side of the frame is secured thereto without adhesive, the paper holding arrangement being laterally outer and along at least one of the first and second lateral sides.

2. The frame of claim 1, wherein, said paperboard holding arrangement includes
   a channel recess to receive an edge of the paperboard folded generally normal to the first and second main faces of the frame, and
   at least one protrusion in the channel recess configured to retain a portion of the edge of the paperboard wrapped on exterior surfaces of the first and second faces and first side of the frame to secure the paperboard to the frame without adhesive.

3. The frame of claim 1, wherein said rear end includes a slot to receive an edge of the paperboard.

4. The frame of claim 1, further comprising:
   a coupling element in each of the first and second lateral sides of the frame positioned near the open front end for receiving a removable locking mechanism for securing the tray in the frame.

5. The frame of claim 1, wherein at least one of said first and second main faces comprises a plurality of interconnected portions in a predetermined pattern to form an endoskeleton/exoskeleton.

6. The frame of claim 1, wherein said paperboard holding arrangement comprises upper and lower recesses each receiving an edge of the paperboard folded generally normal to the first and second main faces of the frame.

7. The frame of claim 6, wherein each of the upper and lower recesses of said paperboard holding arrangement further comprises at least one protrusion to hold the folded edge of the paperboard in said recess.

8. The frame of claim 7, wherein each said at least one protrusion is formed near an upper end of said recess.

9. The frame of claim 1, further comprising parallel rails on interior surfaces of each of said first and second lateral sides for guiding the tray for holding the information disk into an interior of the frame.

10. The frame of claim 1, wherein each end of said slot includes a latch to secure the tray in an open or closed position within the frame.

11. The frame of claim 10, wherein said latch comprises an inverse contour of said raised contour.

12. A unit for packaging and storing an information storage medium (ISM), comprising:
   a) a frame capable of being wrapped by a paperboard including
      i) first and second faces,
      ii) first and second sides connecting said first and second faces,
      iii) a paperboard holding arrangement such that the paperboard wrapped on exterior surfaces of the first and second faces and first side of the frame is secured thereto without adhesive,
      iv) a slot in at least one of the first and second faces; and
   b) a tray including
      i) first and second surfaces, said first surface of said tray having a recess to seat the ISM, and
      ii) a raised contour on at least one of the first and second surfaces, wherein
         said raised contour on the tray engages the slot in the frame enabling the tray to be slidable within said frame, and
         each end of said slot includes a latch to secure the tray in an open or closed position within the unit.

13. The unit of claim 12, wherein said latch comprises an inverse contour of said raised contour.

14. A unit for packaging and storing an information storage medium (ISM), comprising:
   a) a frame capable of being wrapped by a paperboard including
      i) first and second faces,
      iii) a paperboard holding arrangement configured to secure the paperboard wrapped on exterior surfaces of the first and second faces and first side of the frame; and
   b) a tray slidable in said frame, said tray having first and second surfaces with said first surface of said tray having a recess to seat the ISM, wherein
      said frame has a front portion and a rear portion, and further comprises a pusher member located on an interior surface of said frame near the rear portion, and
      said tray has a front portion and a rear portion conforming to the front and rear portions of the frame, and further comprises a guide located on said first surface near the rear portion of said tray, said pusher member being slidable within said guide when said tray is inserted in said frame from an open position to a closed position or when said tray is pulled out of said frame from the closed position to the open position.

15. The unit of claim 14, wherein said recess of said tray comprises a lower leveled surface surrounded by an angled wall with a shelf formed between an edge of the recess and the angled wall, a peripheral portion of the ISM seated in the recess resting on said shelf reducing the surface area of the ISM in contact with the tray.

16. The unit of claim 15, wherein said tray has a front portion and a rear portion conforming to the front and rear portions of the frame, and said tray further comprises a protrusion at the periphery of said recess near the front portion of said tray, said protrusion protruding into said recess and being formed above said leveled surface such that the ISM is held between said protrusion and leveled surface when said tray is in a closed position within said frame.

17. The unit of claim 16, wherein said pusher member gradually pushes the ISM resting on said leveled surface of the recess towards the front portion of said tray when the tray is inserted into said frame from an open position to a closed position.

18. A unit for packaging and storing an information storage medium (ISM), comprising:
   a) a frame capable of being wrapped by a paperboard including
      i) first and second faces,
      ii) first and second sides connecting said first and second faces, and
      iii) a paperboard holding arrangement configured to secure the paperboard wrapped on exterior surfaces of the first and second faces and first side of the frame; and
   b) a tray slidable in said frame, said tray having first and second surfaces with said first surface of said tray having a recess to-seat the ISM, wherein
      said frame has a front portion and a rear portion, and further comprises a pusher member located on an interior surface of said frame near the portion,
      said tray has a front portion and a rear portion conforming to the front and rear portions of the frame, and
      said pusher member has a front portion and rear portion conforming to the front and rear portions of the frame, and comprises surfaces in the front portion, sized and shaped to engage and push the ISM seated in the recess of the tray towards the front portion of the tray when the tray is inserted in said frame from an open position to a closed position.

19. The unit of claim 18, wherein the surfaces in the front portion of the pusher member are generally V-shape.

20. A unit for packaging and storing an information storage medium (ISM), comprising:
   a) a frame capable of being wrapped by a paperboard including
      i) first and second faces,
      ii) first and second sides connecting said first and second faces, and
      iii) a paperboard holding arrangement configured to secure the paperboard wrapped on exterior surfaces of the first and second faces and first side of the frame; and
   b) a tray slidable in said frame, said tray having first and second surfaces with said first surface of said tray having a recess to seat the ISM, wherein
      said frame has a front portion and a rear portion, and further comprises a pusher member located on an interior surface of said frame near the rear portion, and
      said pusher member comprises an angled surface near a front portion of said pusher member, a first leveled surface at one end of said angled surface, and a wall perpendicular to said leveled surface at an end of said level surface opposite from the end of said angled surface.

21. The unit of claim 20, wherein said tray has a front portion and a rear portion conforming to the front and rear portions of the frame, and said pusher member gradually pushes the ISM seated in the recess towards the front portion of said tray when the tray is inserted into said frame from an open position to a closed position.

22. The unit of claim 20, wherein said pusher member further comprises a second leveled surface parallel to said first leveled surface such that the ISM is held between the first and second leveled surfaces when the tray is in a closed position within said frame.

23. A unit for packaging and storing an information storage medium (ISM) having upper and lower surfaces, comprising:
   a) a frame having
      i) first and second faces,
      ii) first and second sides connecting said first and second faces, and
      iii) a pusher member on said first face, and
   b) a tray, slidable in said frame, having a recess to seat the ISM, and a guide, wherein
      said pusher member on the first face of said frame is slidable in said guide of said tray and prevents the ISM from moving in said recess when said tray is in a closed position within said frame.

24. The unit of claim 23, wherein said pusher member comprises an angled surface near a front portion of said pusher member, a first leveled surface at one end of said angled surface, and a wall perpendicular to said leveled surface at an end of said leveled surface opposite from the end of said angled surface.

25. The unit of claim 24, wherein said frame has a front portion and a rear portion, said tray has a front portion and a rear portion conforming to the front and rear portions of the frame, and said pusher member gradually pushes the ISM towards the front portion of said tray when the tray is inserted into said frame from an open position to the closed position.

26. The unit of claim 24, wherein said first leveled surface and said wall form a ledge to hold the ISM seated in the recess when the tray is in the closed position within said frame.

27. The unit of claim 24, wherein said pusher member further comprises a second leveled surface parallel to said first surface such that the ISM is held between the first and second leveled surfaces when said tray is in the closed position within said frame.

28. The unit of claim 23, wherein said recess of said tray comprises a lower surrounded by an angled wall with a shelf formed between an edge of the recess and the angled wall, a peripheral portion of the ISM seated in the recess resting on said shelf reducing the surface area of the ISM in contact with the tray.

29. The unit of claim 28, wherein said frame has a front portion and a rear portion, said tray has a front portion and a rear portion conforming to the front and rear portions of the frame, and said tray further comprises a protrusion at the periphery of said recess near the front portion of said tray, said protrusion protruding into said recess and being formed above said leveled surface such that the ISM seated in the tray is held between said protrusion and leveled surface when to said tray is in the closed position within said frame.

30. The unit of claim 28, wherein said frame has a front portion and a rear portion, said tray has a front portion and a rear portion conforming to the front and rear portions of the frame, and said pusher member gradually pushes the ISM resting on the leveled surface of the recess towards the front portion of said tray when the tray is inserted into said frame from an open position to the closed position.

31. A system for preventing theft of an information storage media (ISM), comprising:
   a) a case including a frame wrapped with a paperboard and a tray with a recess to seat said ISM, said tray being slidable in said frame to a closed position within said frame; and
   b) a locking mechanism having
      1) a housing having a main surface,
      2) two generally parallel flanges extending from the main surface of the housing to overlie portions of the case,
      3) a fixed coupling element at one end of the housing for releasably engaging a first coupling region of the case; and
      4) a movable coupling element at the other end of the housing for engaging a second coupling region of the case, wherein
   with the two generally parallel flanges positioned to overlie portions of the case and the fixed coupling element engaging a first coupling region of the case, the movable coupling element
      i) engages a second coupling region of the case when the movable coupling element is in a closed position, and
      (ii) separates from the other end of the housing to decouple from the second coupling region on the case when the movable coupling element is in an open position allowing the locking mechanism to become fully separated from the case.

32. The system of claim 31, further including a decoupler for enabling the movable coupling element to move from the closed position to the open position.

33. A tray for holding a disk and being slidable on guide rails and at least one slot of a frame, comprising:
   first and second main surfaces, at least one of the first and second main surfaces having a raised contour configured to engage the at least one slot of the frame, the raised contour being appropriately dimensioned to be slidable in said at least one slot of the frame;

sidewall surfaces at a periphery of the first and second main surfaces;

a recess in said first main surface forming a seat for the disk; and a spring having only one end attached to the tray near a periphery of said recess with an outer peripheral surface of the spring formed in an arcuate contour in a direction protruding into the recess of said tray, said outer peripheral surface of the spring including a ledge to engage a peripheral portion of the disk.

34. The tray of claim 33, wherein said tray is made of an injection molded plastic material.

35. The tray of claim 33, wherein said tray includes a first cutout region in the recess and a second cutout region at a peripheral region of said recess opposite said spring for user to insert or remove the disk from the tray.

36. The tray of claim 33, wherein said outer peripheral surface of the spring formed in an arcuate contour applies a biasing force toward the center if the recess when the disk is inserted into the recess engaging the ledge.

37. The tray of claim 33, further comprising at least one protrusion formed at a peripheral region of said recess to hold the disk.

38. The tray of claim 37, wherein said protrusion has an angled bevelled surface to facilitate at least one of insertion and removal of the disk by a user.

39. The tray of claim 33, wherein said raised contour includes thick and thin portions and said at least one slot has an inverse contour at each end, said raised contour being engageable with the inverse contour at each end of said at least one slot to latch the tray in an open or closed position within the frame.

40. The tray of claim 33, wherein said raised contour is integral with the tray.

41. A unit for packaging and storing an information storage medium (ISM), comprising:

a) a frame having an open front and capable of being wrapped by a paperboard, including
first and second main faces,
first and second lateral sides connecting said first and second main faces,
a rear end opposing the open front, and connecting said first and second main faces and the first and second lateral sides,
a slot in at least one of the first and second main faces,
a channel recess formed laterally outer and along at least one of the first and second lateral sides to receive and retain an edge of the paperboard folded generally normal to the first and second main faces of the frame, and
at least one protrusion in the channel recess configured to retain a portion of the edge of the paperboard wrapped on exterior surfaces of the first and second faces and first side of the frame to secure the paperboard to the frame without adhesive; and b) a tray for holding the ISM, including
first and second main surfaces with sidewall surfaces at a periphery of the first and second main surfaces, at least one of the first and second main surfaces having a raised contour engaging the slot in the at least one of the first and second main faces of the frame, the raised contour being appropriately dimensioned to be slidable in said slot of the frame; and a recess in said first main surface forming a seat for the ISM.

42. The unit of claim 41, wherein said tray further comprises a spring having an outer peripheral surface formed in contour to receive a peripheral portion of the ISM such that said contour partially overlaps the upper surface of the ISM.

43. The unit of claim 42, wherein said tray further includes a first cutout region in the recess and a second cutout region at a peripheral region of said recess opposite said spring for a user to insert or remove the ISM from the tray.

44. The unit of claim 42, wherein said outer peripheral surface of said spring if formed in an arcuate contour in a direction protruding into the recess of said tray.

45. The unit of claim 44, wherein said outer peripheral surface of the spring includes a ledge to engage a peripheral portion of the ISM.

46. The unit of claim 44, wherein said outer peripheral surface of the spring formed in said arcuate contour applies a biasing force toward the center of the recess when the ISM is inserted into the recess.

47. The unit of claim 42, wherein said spring is injection molded with said tray, and only one end of said spring is attached to said tray.

48. The unit of claim 41, further comprising at least one protrusion at a peripheral region of said recess to hold the ISM.

49. The unit of claim 48, wherein said protrusion has an angled bevelled surface to facilitate at least one of insertion and removal of the ISM by a user.

50. The unit of claim 41, wherein said raised contour includes thick and thin portions.

51. The unit of claim 41, wherein said raised contour is integral with the tray.

52. The unit of claim 41, further comprising a slot formed outer said rear end of the frame to receive an edge of the paperboard folded generally normal to the first and second main faces of the frame.

53. The unit of claim 41, wherein at least one of said first and second faces comprises a plurality of interconnected portions to form an endoskeleton/exoskeleton.

54. The unit of claim 41, wherein said at least one protrusion is formed near an upper end of said channel recess.

55. The unit of claim 41, further comprising parallel rails on interior surfaces of each of said first and second lateral sides of the frame.

56. The unit of claim 41, wherein said frame has a front portion and a rear portion, and further comprises a pusher member located on an interior surface of said frame near the rear portion.

57. A unit for packaging and storing an information storage medium (ISM), comprising:
a) a frame including
i) first and second faces, and
ii) first and second sides connecting said first and second faces; and
b) a tray slidable in said frame, said tray having first and second surfaces with said first surface of said tray having a recess to seat the ISM, wherein
said frame has a front portion and a rear portion, and further comprises a pusher member located on an interior surface of said frame near the rear portion, and
said tray has a front portion and a rear portion conforming to the front and rear portions of the frame, and further comprises a guide located on said first surface near the rear portion of said tray, said pusher member being slidable within said guide when said tray is inserted in said frame from an open position to a closed position or when said tray is pulled out of said frame from the closed position to the open position, wherein said tray further comprises a protrusion at the periphery of said recess near the front portion of said tray, said protrusion protruding into said recess and being formed above said level surface such that the ISM is held between said protrusion and level surface when said tray is in a closed position within said frame, and said pusher member gradually pushes the ISM resting on said level surface of the recess towards the front portion of said tray when the tray is inserted into said frame from an open position to a closed position.

58. The unit of claim 57, wherein said recess of said tray comprises a well surrounded by an angled wall with a level surface formed between an edge of the recess and the angled wall, a peripheral portion of the ISM seated in the recess resting on said level surface reducing the surface area of the ISM in contact with the tray.

59. The unit of claim 57, wherein the pusher member includes a generally v-shaped portion to receive and push the ISM.

60. The unit of claim 57, wherein the unit includes a locking arrangement to lock the tray into an open and closed position.

61. The unit of claim 60, wherein the locking arrangement includes a post fixed to the tray and a guide formed within the frame, the post being slidable within the guide when the tray is slid into and out of the housing.

62. The unit of claim 61, wherein the guide includes spaced end portions to receive and hold the post when the tray is slid into the open and closed positions.

63. The unit of claim 57, wherein the housing includes first and second opposing faces and a side connecting the faces, the faces and side capable of being covered by a paperboard.

64. The unit of claim 63, wherein the frame includes a channel to receive the paperboard.

65. The unit of claim 64, wherein the channel includes a protrusion to secure at least an edge portion of the paperboard in the channel.

66. A unit for packaging and storing an information storage medium (ISM), comprising:
a) a frame including
i) first and second faces, and
ii) first and second sides connecting said first and second faces; and
b) a tray slidable in said frame, said tray having first and second surfaces with said first surface of said tray having a recess to seat the ISM, wherein
said frame has a front portion and a rear portion, and further comprises a pusher member located on an interior surface of said frame near the rear portion,
said tray has a front portion and a rear portion conforming to the front and rear portions of the frame, and
said pusher member has a front portion and rear portion conforming to the front and rear portions of the frame, said pusher member comprising surfaces in the front portion, sized and shaped to engage and push the ISM seated in the recess of the tray towards the front portion of the tray when the tray is inserted in said frame from an open position to a closed position, wherein
the surfaces in the front portion of the pusher member are generally V-shape.

67. A unit for packaging and storing an information storage medium (ISM), comprising:
a) a frame including
i) first and second faces, and
ii) first and second sides connecting said first and second faces; and
b) a tray slidable in said frame, said tray having first and second surfaces with said first surface of said tray having a recess to seat the ISM, wherein
said frame has a front portion and a rear portion, and further comprises a pusher member located on an interior surface of said frame near the rear portion, and
said pusher member comprises an angled surface near a front portion of said pusher member, a first leveled surface at one end of said angled surface, and a wall perpendicular to said leveled surface at an end of said level surface opposite from the end of said angled surface.

68. The unit of claim 67, wherein said tray has a front portion and a rear portion conforming to the front and rear portions of the frame, and said pusher member gradually pushes the ISM seated in the recess towards the front portion of said tray when the tray is inserted into said frame from an open position to a closed position.

69. The unit of claim 67, wherein said pusher member further comprises a second leveled surface parallel to said first leveled surface such that the ISM is held between the first and second leveled surfaces when the tray is in a closed position within said frame.

70. A unit for packaging and storing an information storage medium (ISM), comprising:
a) a frame defining a storage space, including
i) an open front end,
ii) a rear end opposing the open front end,
iii) first and second faces,
iv) first and second sides connecting said first and second faces, and the open front end and read end, and
v) a non-resilient pusher member located on an interior surface of said frame near the rear portion; and
b) a tray slidable into and out of the storage space of said frame through the open front end, said tray having a main upper surface with a recess to seat the ISM, a surface area of the recess being greater than a surface area of the ISM,
said non-resilient pusher member having surfaces sized and shaped to engage and hold the ISM while pushing the ISM against an end of the recess of the tray when the tray is inserted into the storage space of the frame from an open position to a closed position, wherein
said non-resilient pusher member comprises an angled surface near a front portion of said non-resilient pusher member, a first leveled surface at one end of said angled surface, and a wall perpendicular to said leveled surface at an end of said level surface opposite from the end of said angled surface.

* * * * *